United States Patent
Wang et al.

(10) Patent No.: US 11,632,767 B2
(45) Date of Patent: Apr. 18, 2023

(54) BWP ALLOCATION METHOD, APPARATUS, ELECTRONIC DEVICE AND COMPUTER READABLE STORAGE MEDIUM

(71) Applicant: SAMSUNG ELECTRONICS CO., LTD., Suwon-si (KR)

(72) Inventors: Huiyang Wang, Beijing (CN); Yi Zhao, Beijing (CN); Huan He, Beijing (CN); Xiaohui Yang, Beijing (CN); Sheng Lei, Beijing (CN); Shang Liu, Beijing (CN); Chanjuan Wei, Beijing (CN); Yupu Liu, Beijing (CN); Baozhi Zhang, Beijing (CN); Junwei Ren, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 17/319,681

(22) Filed: May 13, 2021

(65) Prior Publication Data
US 2022/0039101 A1    Feb. 3, 2022

(30) Foreign Application Priority Data
Jul. 28, 2020    (CN) .......................... 202010740835.6

(51) Int. Cl.
*H04W 72/10*    (2009.01)
*H04W 72/0453*    (2023.01)
(Continued)

(52) U.S. Cl.
CPC .............. *H04W 72/10* (2013.01); *H04W 8/24* (2013.01); *H04W 52/0206* (2013.01);
(Continued)

(58) Field of Classification Search
None
See application file for complete search history.

(56) References Cited

U.S. PATENT DOCUMENTS

| 2014/0321288 A1 | 10/2014 | Ha et al. |
| 2019/0104543 A1 | 4/2019 | Park |
| (Continued) | | |

FOREIGN PATENT DOCUMENTS

| WO | 2020/056745 | 3/2020 |

OTHER PUBLICATIONS

International Search Report and Written Opinion dated Jul. 28, 2021 in corresponding International Application No. PCT/KR2021/005270.

*Primary Examiner* — Saumit Shah
(74) *Attorney, Agent, or Firm* — Nixon & Vanderhye P.C.

(57) ABSTRACT

Embodiments of the present disclosure provide a BWP allocation method, apparatus, electronic device, and a computer-readable storage medium, and relate to the field of communication technologies. The method includes: acquiring service-related information of at least one base station; determining configuration information of the bandwidth part (BWP) of the at least one base station based on the service-related information of the at least one base station; and configuring the BWP of the at least one base station based on the configuration information. The BWP allocation method may meet requirements of different services and different user capabilities, improve a network throughput, and reduce energy consumption.

18 Claims, 28 Drawing Sheets

(51) Int. Cl.
*H04W 52/02* (2009.01)
*H04W 72/04* (2023.01)
*H04W 8/24* (2009.01)

(52) U.S. Cl.
CPC ... *H04W 72/0426* (2013.01); *H04W 72/0453* (2013.01); *H04W 72/0486* (2013.01)

(56) References Cited

U.S. PATENT DOCUMENTS

| | | |
|---|---|---|
| 2019/0132845 A1 | 5/2019 | Babaei et al. |
| 2019/0261425 A1 | 8/2019 | Park et al. |
| 2021/0119745 A1* | 4/2021 | Li .................. H04L 5/0042 |
| 2021/0314021 A1* | 10/2021 | Sakhnini ............ H04L 5/006 |
| 2021/0345160 A1* | 11/2021 | Yao ............... H04W 28/0268 |
| 2021/0377913 A1* | 12/2021 | Li .................. H04W 72/02 |

* cited by examiner

RELATED ART

RELATED ART

● UE    Tx power coverage    UE distribution area

RELATED ART

FIG. 13

| gNB id | class id | weight | PRB quantity |
|---|---|---|---|
| 1 | 1 | 2 | 30 |
| 1 | 2 | 2 | 60 |
| 1 | 3 | 2 | 20 |
| 1 | 4 | 2 | 5 |
| 2 | 1 | 1 | 20 |
| 2 | 2 | 1 | 20 |
| 2 | 3 | 1 | 30 |
| 3 | 1 | 3 | 40 |
| 3 | 2 | 3 | 40 |
| 4 | 1 | 1 | 70 |
| 5 | 2 | 1 | 30 |
| 5 | 3 | 1 | 40 |

Given Class Table

| gNB id | class id | weight | PRB quantity |
|---|---|---|---|
| 3 | 1 | 3 | 40 |
| 1 | 1 | 2 | 30 |
| 2 | 1 | 1 | 20 |
| 4 | 1 | 1 | 70 |
| 3 | 2 | 3 | 40 |
| 1 | 2 | 2 | 60 |
| 5 | 2 | 1 | 30 |
| 2 | 2 | 1 | 20 |
| 1 | 3 | 2 | 20 |
| 5 | 3 | 1 | 40 |
| 2 | 3 | 1 | 30 |
| 1 | 4 | 2 | 5 |

Sorted Class Table

→ 1st key
→ 2nd key
→ 3rd key

High: 3; Middle: 2; Low: 1

|  |  | To class q | | | | |
|---|---|---|---|---|---|---|
|  |  | class 1 | class 2 | class 3 | class 4 | ... |
| From class p | class 1 | 3 | 3 | 3 | 2 |  |
|  | class 2 | 2 | 2 | 3 | 1 |  |
|  | class 3 | 3 | 3 | 2 | 2 |  |
|  | class 4 | 2 | 2 | 1 | 1 |  |
|  | ... |  |  |  |  |  |

FIG. 18

| Condition | Tx power for each antenna port |
|---|---|
| C_in_T < threshold 1 | 23 |
| threshold 1 < C_in_T < threshold 2 | 25 |
| threshold 2 < C_in_T < threshold 3 | 27 |
| C_in_T > threshold 3 | 29 |

BWP ALLOCATION METHOD, APPARATUS, ELECTRONIC DEVICE AND COMPUTER READABLE STORAGE MEDIUM

CROSS-REFERENCE TO RELATED APPLICATION

This application is based on and claims priority under 35 U.S.C. § 119 to Chinese Patent Application No. 202010740835.6, filed on Jul. 28, 2020, in the Chinese Intellectual Property Office, the disclosure of which is incorporated by reference herein in its entirety.

BACKGROUND

Field

The disclosure relates to the field of communication technologies. For example, the disclosure relates to a bandwidth part (BWP) allocation method, apparatus, electronic device, and computer storage medium.

Description of Related Art

In the fifth-generation mobile communication system (5G), the third-generation partnership project (3GPP) redefines new available spectrum resources and corresponding bandwidth for operators, for example, 400 MHz maximum at 28 GHz band.

However, in existing implementation schemes, a configuration function of BWP (bandwidth Part) is still in an initial stage, for example, a static configuration, which does not support dynamics. Therefore, it is necessary to optimize the existing BWP configuration.

SUMMARY

Embodiments of the disclosure provide a BWP allocation method, apparatus, electronic device, and computer-readable storage medium.

According to an example embodiment, a bandwidth part (BWP) allocation method is provided, the method comprising: acquiring service-related information of at least one base station; determining configuration information of the BWP of the at least one base station based on the service-related information of the at least one base station; and configuring the BWP of the at least one base station based on the configuration information.

According to an example embodiment, a bandwidth part (BWP) allocation apparatus is provided, the apparatus comprising: an acquiring module comprising circuitry configured to acquire service-related information of at least one base station; a determining module comprising circuitry configured to determine configuration information of BWP of the at least one base station based on the service-related information of the at least one base station; and an allocation module comprising circuitry configured to configure the BWP of the at least one base station according to the configuration information.

According to an example embodiment, an electronic device is provided, the electronic device comprising: one or more processors; a memory; one or more application programs stored in the memory and configured to be executed by the one or more processors to implement the BWP allocation method according to the above example embodiment.

According to an example embodiment, a computer-readable storage medium is provided. The storage medium stores at least one instruction, at least one program, a code set, or an instruction set, and the at least one instruction, the at least one program, the code set or the instruction when executed by a processor of an electronic device, causes the electronic device to perform operations corresponding to the BWP allocation method according to the above example embodiment.

The disclosure provides a BWP allocation method, apparatus, electronic device, and computer-readable storage medium. Embodiments of the disclosure update configuration information by considering the service-related information of each base station, which can meet requirements of different services, different user capabilities, and can adapt to the service features that change over time, allocate time-varying BWP configuration information to each base station, improve a network throughput and reduce energy consumption.

According to various embodiments, for changeable service requirement, the BWP bandwidth can be dynamically adjusted, such that the allocated bandwidth can be well adapted to user requirements, energy can be saved for low user requirements, and throughput can be provided for high user requirements.

According to various embodiments, for changeable user location distribution, the power of the BWP can be dynamically adjusted, such that the allocated power can better cover users, and reduce the power in areas where there are no users, that is, to reduce a coverage area, which can save energy consumption for a base station.

According to various embodiments, for users moving between cells, bandwidth and frequency positions between the BWPs between base stations can be dynamically coordinated, such that the coordinated scheduling between base stations can be ensured, the user's service requirement can be guaranteed, and overall throughput of system can be improved.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 13 is a diagram illustrating an example of sorting BWP classes according to various embodiments;

FIG. 14 is a diagram illustrating an example of frequency location allocation of multiple BWP classes of different base stations according to various embodiments;

FIG. 15 is a diagram illustrating an example of a collision relationship table according to various embodiments;

FIG. 18 is a diagram illustrating an example of the relationship between different overall collision degrees and power according to various embodiments;

DETAILED DESCRIPTION

Figure 1:
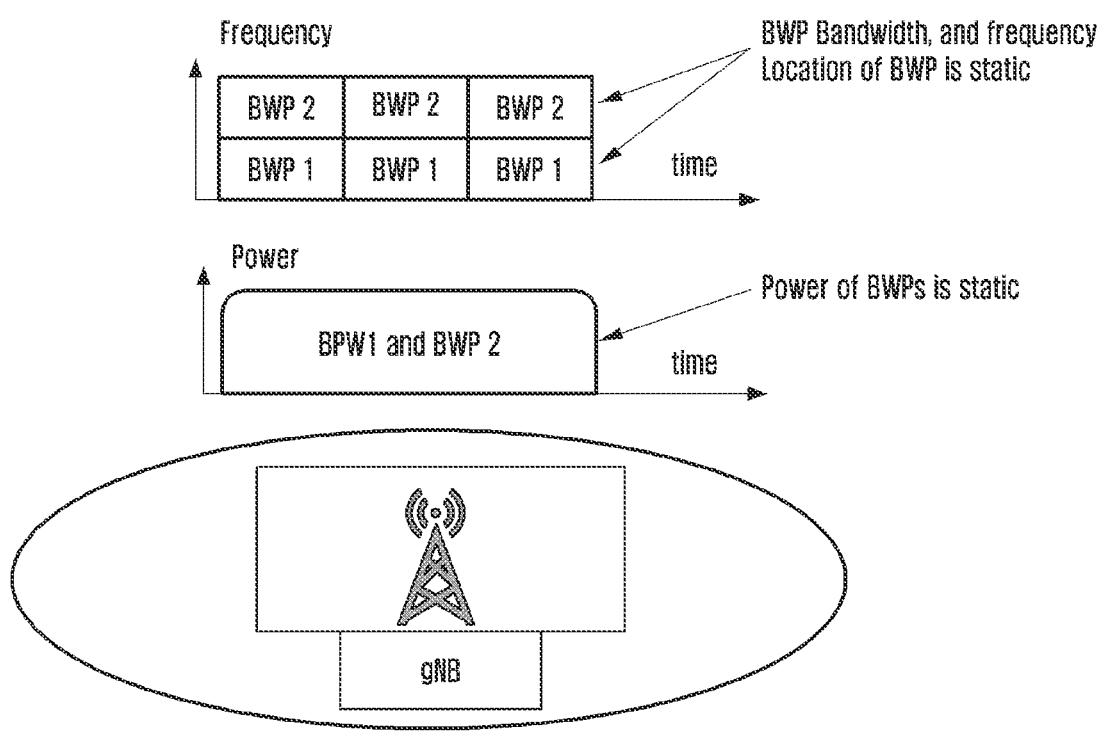
FIG. 1 is a diagram illustrating a BWP configuration method in an example of the prior art.

Various example embodiments of the disclosure will be described in greater detail hereafter. Examples of the various embodiments have been illustrated in the drawings throughout which same or similar reference numerals refer to same or similar elements or elements having same or similar functions. It will be understood that the various embodiments described hereafter with reference to the drawings are merely illustrative, not limiting.

It should be understood by those skill in the art that singular forms "a", "an", "the", and "said" may be intended to include plural forms as well, unless otherwise stated. It should be further understood that terms "include/including" used in this disclosure may specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to better support UE (User Equipment) types with multiple services and different capabilities in a 5G network, the 3GPP communication protocol adds a function of supporting bandwidth part (BWP). However, in existing implementation schemes, the configuration function of BWP is still in the initial stage, that is, a static configuration, which does not support dynamics, thus it cannot adaptively meet service changes in different time periods. Wherein, the term static, as used above, may refer to:

(1) The bandwidth of BWP being fixed and not changing with time;

(2) The frequency location of BWP being fixed and not changing with time;

(3) The transmit power on the BWP being fixed and not changing with time.

Moreover, the BWP allocation of each base station is independent of each other.

As illustrated in FIG. 1, the base station in FIG. 1 has two BWPs, but their bandwidth, frequency location and transmit power are fixed and do not change with time; and the configuration of the BWPs on a base station does not consider the other influence of the base station, which is an independent allocation method.

For each BWP, the fixed bandwidth cannot well match requirements of service changes.

Figure 2:
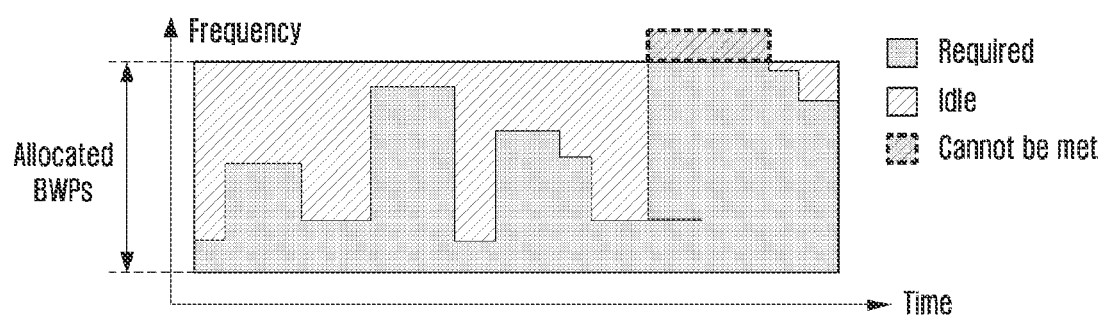
FIG. 2 is a diagram illustrating a BWP configuration method in an example of the prior art.

However, the user's service requirements may change with time. As illustrated in FIG. 2, if the bandwidth of a BWP is fixed, when there are a lot of service requirements when busy, it will cause network congestion; when there is little service requirement when idle, it will cause a waste of radio resources.

For each BWP, the fixed power cannot match the location distribution of users in this cell.

Figure 3:
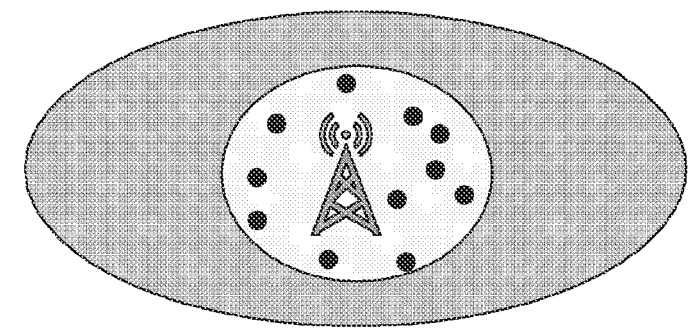
FIG. 3 is a diagram illustrating a BWP configuration method in an example of the prior art.
Figure 3:
Figure 3:

If the BWP power value is a fixed value, the corresponding cell coverage is also fixed, but the user location distribution in a cell changes with people's daily activities, as illustrated in FIG. 3, in a certain period of time, the UEs in the cell are distributed in the center location of the cell, and there are no users at an edge region. Therefore, if the coverage of the cell cannot be adapted to a user location distribution of the cell, energy may be wasted.

For all BWPs in the entire system, the fixed bandwidth and frequency positions cannot match the location distribution of the service.

Figure 4:
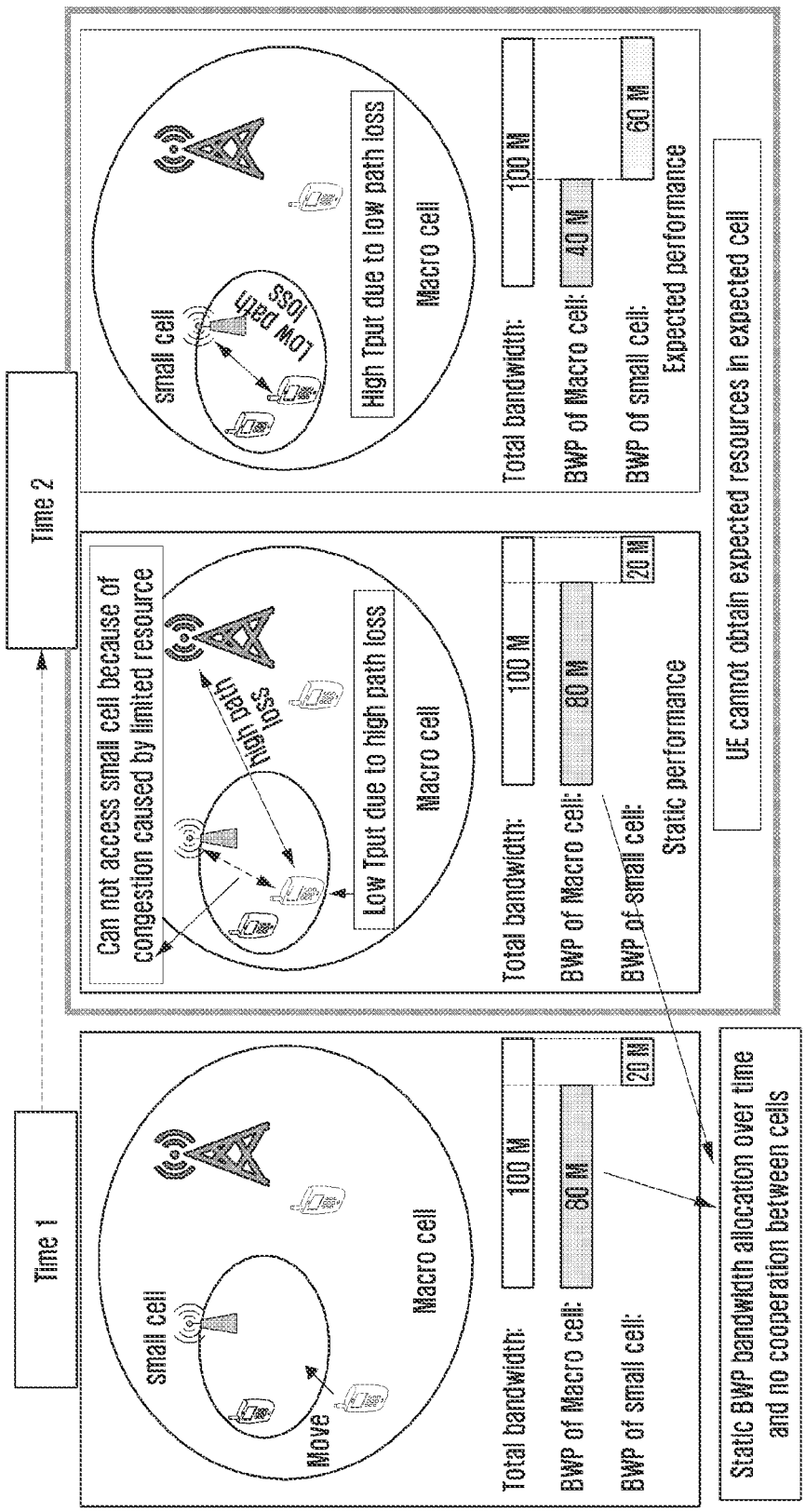
FIG. 4 is a diagram illustrating a BWP configuration method in an example of the prior art.

If the cells lack the ability to coordinate with each other, the bandwidth and frequency positions of some bandwidths cannot be automatically adjusted according to the user's movement, which will cause reduction of the overall performance of the system. As illustrated in FIG. 4, the total system bandwidth is 100 M, the BWP of a macro base station (its coverage area may be referred, for example, to as a macro cell) is 80 M, and the BWP of a small base station (its coverage area may be referred, for example, to as a small cell) is 20 M. When a UE moves from the coverage area of the macro base station to the coverage area of the small base station (for example, the signal quality of the small base station is better than the signal quality of the macro base station), as illustrated in FIG. 4, from time 1 to time 2, referring to "Static performance" in the middle of the figure, since the small base station allocates less BWP bandwidth resources, network congestion is prone to occur, which makes this user unable to access the small base station, users can only access macro base station, but the path loss is high, so throughput (Tput) is lower. Since the BWPs of the small base station and the macro base station are statically allocated and do not change with time, and there is no coordination between the macro cell and the small cell, thus the small base station and the macro base station cannot coordinate the bandwidth resources between the BWPs, and cannot provide better services for users. The UE cannot acquire the expected resources in the expected cell. Therefore, if the base stations' BWP bandwidths can be coordinated, when the user moves to the coverage area of the small base station, the macro base station can reduce the bandwidth (for example, the bandwidth decreases from 80 M to 40 M), and the small base station increases the bandwidth (for example, the bandwidth increases from 20 M to 60 M), such that the small base station has more bandwidth resources, and the user can access the small base station. Since the path loss is small, the Tput is also relatively high. Referring to the "expected performance" on the right of the figure, users can be provided with faster and better service.

The number of base stations in the 5G network may be far more than that in the 4G network. In order to better manage and coordinate the resources between the base stations, the disclosure proposes that a self-organizing network (SON) server may collect base station data and UE data, analyze UE capabilities and service features, and classify different BWPs for the same UE capability and similar service features. Based on the BWP class, a PRB (Physical Resource Block) prediction may be performed, and the interference relationship between the base stations needs to be comprehensively considered, and differentiated configuration parameters of different BWP classes are judged, and finally corresponding operations are performed according to the configuration parameters.

In view of at least the foregoing shortcomings in the prior art or field that need to be improved, various example embodiments of the disclosure enable 5G base stations to adapt to different service scenarios and coordinate different BWP resources between base stations. For example, by classifying services with the same UE capability and similar types of services, corresponding to different bandwidth resource BWPs, the requirements of multiple UE capabilities and different types of services may be better satisfied, and the throughput of the network may be finally improved and energy consumption may be saved.

Examples of how various embodiments of the disclosure address the various technical deficiencies noted above will be described in greater detail below with reference to various example embodiments. The following embodiments can be combined with each other, and the same or similar concepts or processes may not be repeated in some embodiments. The embodiments of the disclosure will be described below in conjunction with the drawings.

Figure 5:
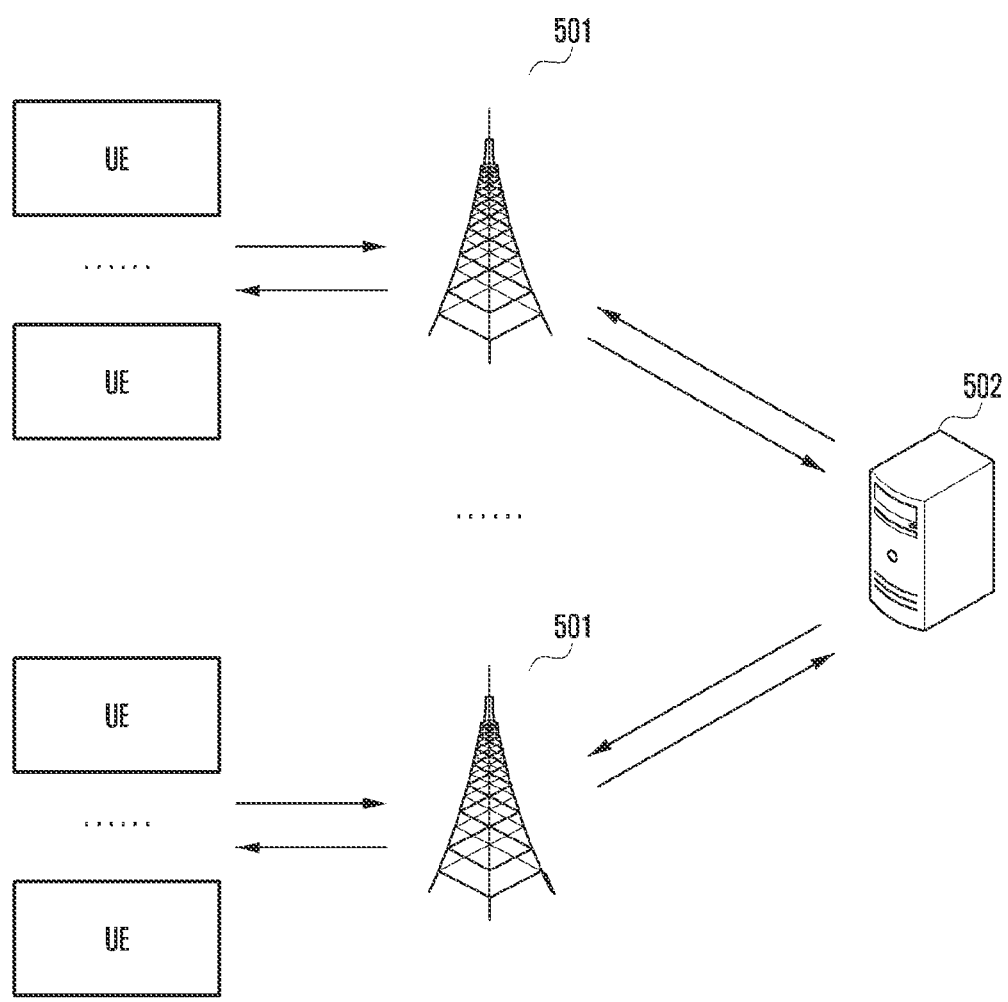
FIG. 5 is a diagram illustrating an application environment diagram of an example BWP allocation method according to various embodiments.

As illustrated in FIG. 5, the BWP allocation method according to various embodiments can be used, for example, and without limitation, in the following scenarios: multiple base stations 501 receive capability information, service type information, and channel information of multiple UEs; multiple base stations 501 transmit the neighboring cell relation of the base station, traffic amount, and received capability information of the UE, service type information, and channel information to the server 502, and the server 502 respectively determines the configuration information of the BWP to be allocated of the base station 501 based on the capability information of the UE, service type information, and channel information, and the neighboring cell relation of the base station and traffic amount; the server 502 transmits the configuration information to the corresponding base station 501, and the base station 501 correspondingly allocates the BWP based on the configuration information.

The foregoing is merely an illustrative application example of the BWP allocation method according to various embodiments, and does not limit the application scenarios of the BWP allocation method according to the disclosure. In other examples, the BWP allocation method may also be applied to the base station. The base station may acquire the capability information of multiple UEs, service type information, and channel information, and the base station may determine the configuration information of the BWP to be allocated based on the neighboring cell relation of base stations, the traffic amount and the UE capability information, service type information and channel information, and allocate the BWP correspondingly according to the configuration information.

Figure 6:
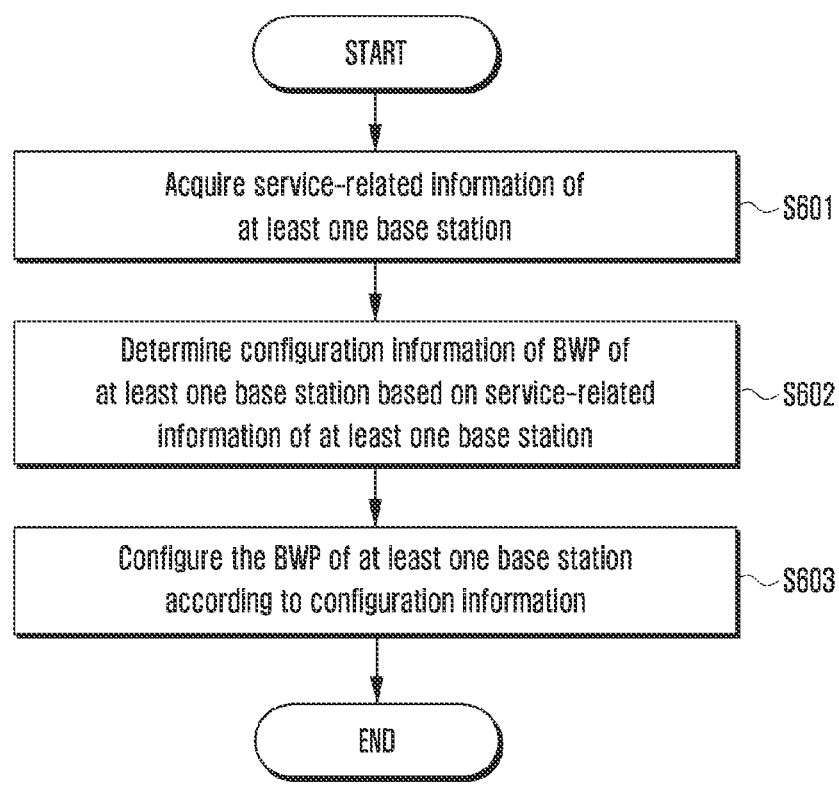
FIG. 6 is a flowchart illustrating an example BWP allocation method according to various embodiments.

Embodiments of the disclosure provide possible implementations. As illustrated in FIG. 6, an example BWP allocation method is provided, which can be applied to the server illustrated in FIG. 5, and may include the following:

According to various embodiments, at operation S601, the method may acquire service-related information of at least one base station.

This operation may be executed by a server, and the server may be a SON server. The SON server may refer, for example, to a network function module that can simultaneously control or coordinate multiple base stations.

For example, the server may collect the neighboring cell relation and history traffic amount of the base station from at least one 5G base station gNB; and collect UE capabilities, service capabilities (such as service type) and channel information from the 5G base station gNB, and may determine the corresponding service-related information based on at least one of the neighboring cell relation and history service, UE capabilities, service capability and channel information. For example, the UE may report data communicated with the base station to the server through the base station. The data communicated with the base station may include UE capabilities, service type information, and channel information of the UE. Wherein, the UE capability may include the maximum bandwidth supported by the UE, for example, the maximum bandwidth supported by an internet of things (IoT) UE is 5 M, and the maximum bandwidth supported by the mobile UE is 100 M. The service type information can be different service types of the UE, such as enhanced Mobile Broadband (eMBB) service, or ultra-Reliable and Low Latency Communications (uRLLC) service, or massive Machine Type Communications (mMTC) service. The channel quality information may be an indicator that reflects the channel quality, such as SINR (signal to interference and noise ratio) and the like.

For example, the base station may also report the neighboring cell relation of the base station to the server. For example, the base station may report the list of the base station's neighboring cells to the server, as well as the traffic amount. For example, the history PRB usage may be reported to the server, e.g., the history PRB usage of the base station in last three days, that is 24*3=72 hours PRB usage of the base station.

Generally, there may be a large amount of statistical information in the base station, and the base station may not actively upload all the information to the server unless a certain function of the server has a clear requirement. In the disclosure, the function of the server may be to coordinate allocation of BWPs between base stations, and the server may collect relevant information from the base stations.

Figure 7:
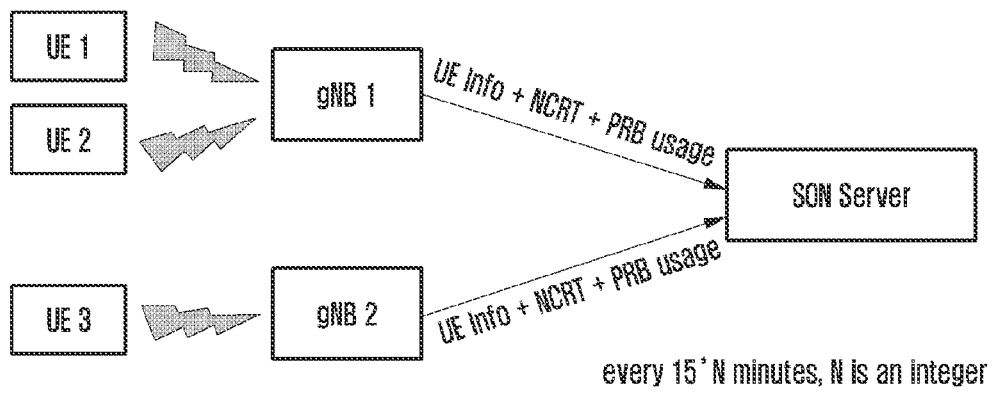
FIG. 7 is a diagram illustrating an example solution for the server to acquire base station data and UE report data according to various embodiments.

In an embodiment, as illustrated in FIG. 7, the server may periodically acquire the neighboring cell relation of at least one base station, history traffic amount (e.g., history PRB usage), and UE information of UEs served by at least one base station, such as UE capability, service type information and UE channel information. For example, the information may be acquired every 15 minutes, or it may be a multiple of 15 minutes, that is, the information can be acquired every 15*N minutes, wherein N is an integer. The server may periodically collect base station data, and configure the BWP periodically, such that it can better adapt to changeable service requirement, dynamically.

According to various embodiments, when the server detects an abnormal network change event such as a network surge, it may acquire the neighboring cell relation and traffic amount, and the UE capabilities, service type information, and UE channel information of the UE served by at least one base station; when the server detects that the prediction of the PRB is inaccurate for many times, the server may acquire the neighboring cell relation of at least one base station, the history traffic amount, and the UE capabilities, service type information and UE channel information of the UE served by the at least base station. Configuring the BWP by detecting abnormal network events can make the configuration of BWP more in line with user requirements.

The service-related information may include at least one of: the BWP class to be allocated, the traffic amount corresponding to the BWP class to be allocated, the information of the neighboring cell relation between base stations (also called neighboring cell relation), and the channel information of the UE served by the base station.

The process of determining the corresponding service-related information according to at least one of neighboring cell relation, history traffic amount, UE capability, service capability (e.g., service type), and channel information will be described in greater below.

According to various embodiments, at operation S602, the method may determine configuration information of the BWP of the at least one base station based on the service-related information of the at least one base station.

The configuration information may include at least one of the number of BWPs, the bandwidth of the BWP, the frequency location of the BWP, and the power of the BWP.

For example, the server may determine the number of BWPs of at least one base station according to the BWP class; determine the bandwidth of the corresponding at least one BWP according to the traffic amount of BWP to be allocated of the at least one base station; determine the frequency location of the BWP according to at least one of the BWP class to be allocated, the information of the neighboring cell between base stations and the traffic amount corresponding to the BWP class to be allocated; and determine the power of the BWP according to at least one of the BWP class to be allocated, the information of the neighboring cell relation between base stations, and the channel information of the UE served by the base station, in which the specific method for determining the configuration information of the BWP will be described in detail below.

According to various embodiments, at operation S603, the method may configure the BWP of at least one base station according to the configuration information.

For example, the operation S603 of configuring the BWP of at least one base station according to the configuration information, may include: transmitting the determined configuration information to the corresponding base station, so that the corresponding base station allocates the BWP correspondingly based on the received configuration information.

According to various embodiments, the server may finally deliver the configuration information of the BWP to each base station, and each base station configures each BWP based on the respective configuration information.

According to various embodiments, the base station may also determine the configuration information of the BWP to be allocated according to at least one of the neighboring cell relation of the base station, the traffic amount, UE capability information, service type information and channel information, and configure the BWP according to the configuration information by itself.

According to various embodiments, by considering the service-related information of each base station, the configuration information is updated, which can meet the needs of different services and different user capabilities, and can adapt to the service features that change with time, and allocate time-varying configuration information of the BWP to each base station, thus the network throughput is improved and the energy consumption is reduced.

An example process of acquiring service-related information of the base station will be described in greater detail below with reference to the drawings.

According to various embodiments, the service-related information may include at least one of the following: the BWP class to be allocated, the traffic amount corresponding to the BWP class to be allocated, the information of the neighboring cell relation between base stations, and the channel information of the user terminal UE served by the base station.

An example process of acquiring the BWP class to be allocated may include:

(1) Classifying UEs served by at least one base station according to the capability information and/or service type information of the UE served by at least one base station;

(2) Determining the BWP class to be allocated of at least one base station based on the classification result of the UE.

For example, it can be classified based on the UE capability information first. The UE capability information may refer, for example, to the maximum bandwidth supported by the UE, for example, the maximum bandwidth supported by the IoT UE may be 5 M, and the maximum bandwidth supported by the mobile UE may be 100 M. These UEs are classified into K classes, that is, K levels; each UE with the same level is further classified based on the service type; the service type of the UE may include at least one of the following: mMTC (massive Machine Type Communications), URLLC (Ultra-Reliable and Low Latency Communications) or eMBB (enhanced Mobile Broadband); in this manner, the final BWP class is formed, a total of m BWP classes, wherein the UE capability information in each BWP class is the same, and the service type is also the same.

The BWP classification is performed to group BWPs with similar services and the same UE capability information into one group. For example, generally, IoT UE capability support smaller bandwidths, such as 5 M, and 5G mobile UEs can support larger bandwidths, such as 100 M; uRLLC services require low latency, eMBB services require broad bandwidth, but mMTC services require not very low service data latency, and the bandwidth requirement is also low.

An example process of determining the traffic amount corresponding to the BWP class to be allocated may include:

(1) acquiring a history traffic amount of at least one BWP class to be allocated of at least one base station;

(2) predicting the traffic amount of at least one BWP class to be allocated of at least one base station according to the history traffic amount of at least one BWP class to be allocated of at least one base station.

The traffic amount may include the PRB usage, for example, the history traffic amount may be the history PRB usage of at least one BWP class to be allocated.

For example, for each BWP class, the predicted PRB usage of this BWP class can be predicted based on the history PRB usage of this BWP class, for example, the traffic amount of the BWP class to be allocated is predicted.

The history PRB usage may include the PRB usage of at least one history period, for example, taking 1 hour as a period, the history PRB usage may be the history PRB usage of the base station in last three days, that is 24*3=72 hours PRB usage of the base station; the predicted PRB usage may include the PRB usage of at least one period in the future, for example, the PRB usage in a next hour, that is, predict the traffic amount of the BWP class to be allocated in a next hour.

According to various embodiments, it may be smooth filtering based on rules, for example, the average value of history PRB usages of multiple periods may be directly acquired, and the acquired average value may be used as the predicted PRB usage; for example, the average value of the history PRB usage in last 72 hours may be acquired; or the average value of the history PRB usage from 8:00 to 9:00 a.m. in last 3 days may be acquired, as the predicted PRB usage from 8:00 to 9:00 a.m. in a next day, that is, the traffic amount of the BWP class to be allocated.

According to various embodiments, an AI (Artificial Intelligence) method may also be used to predict the traffic amount. For example, the AI supported vector regression (SVR) method is used to predict the future requirements for PRB of the BWP class.

For example, predicting the traffic amount of the at least one BWP class to be allocated of the at least one base station according to the history traffic amount of the at least one BWP class to be allocated of the at least one base station, may include:

For any BWP class, the history traffic amount of at least one period of the one BWP class is input into the prediction model to obtain the predicted traffic amount of at least one period of the one BWP class.

Figure 8:
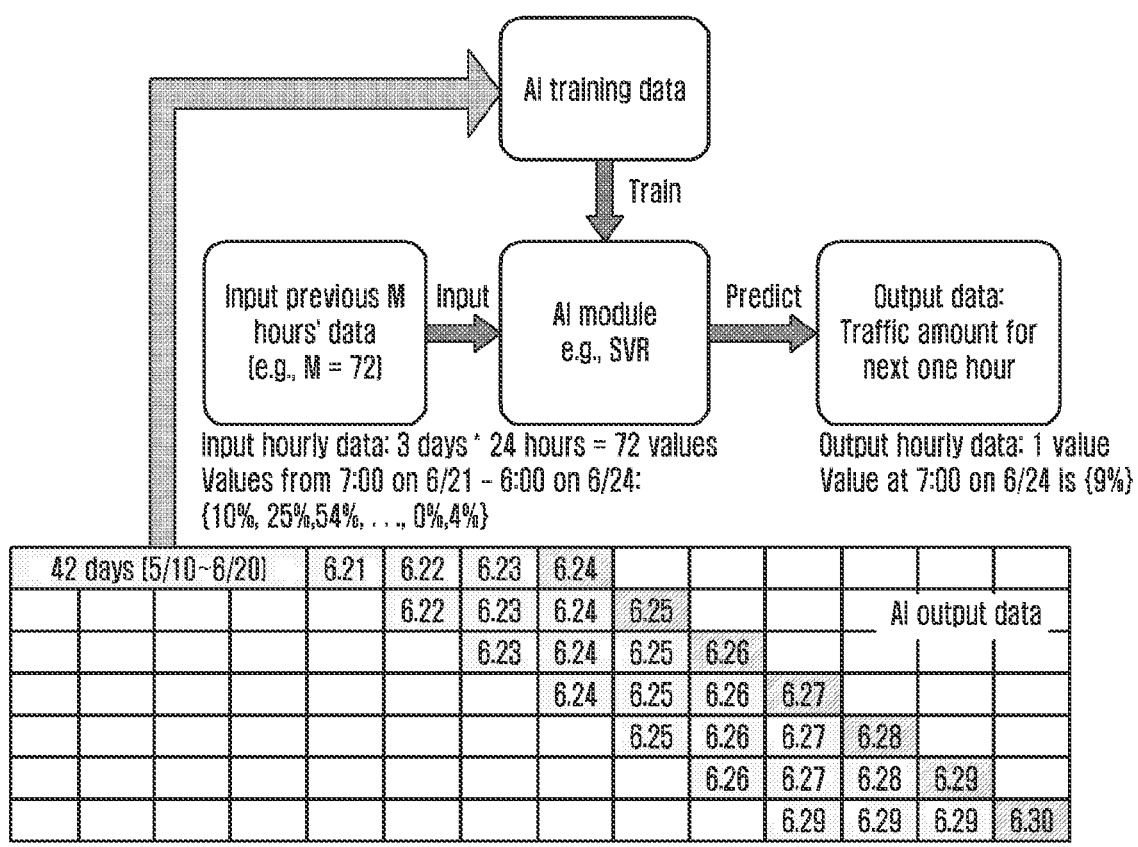
FIG. 8 is a diagram illustrating an example solution for training a model and online prediction by the model according to various embodiments.

As illustrated in FIG. 8, taking the traffic amount as the PRB usage as an example, by the AI method, the PRB data (e.g., the data in last 42 days, such as the data from May 10 to June 20) can be trained to obtain a predictive models (e.g., the SVR model). In actual prediction, the input of the model is the traffic amount data in last M hours, for example, the traffic amount data in last three days (3*24 hours, i.e., M=72 hours) is input, and the output is the traffic amount data of the next hour, for example, for predicting the traffic amount data at 7 am on June 24 (e.g., PRB usage), the input data is the data for each hour between 7:00 on June 21 and 6:00 on June 24 (history PRB usage), and thus there is a total of 3*24 hours=72 values. The prediction model acquired after training can predict the PRB requirement of a BWP class in the next hour, that is, the predicted PRB usage, such as 9%.

According to various examples, the time granularity of most base station data statistics is 15 minutes or a multiple of 15 minutes. The prediction time interval in various examples may be equal to the time granularity of base station data statistics, that is, 15 minutes or a multiple of 15 minutes. However, in a future network, as the computing capability and storage capacity of base stations increase, the time granularity of data statistics may be reduced, and the prediction time interval according to various embodiments may also be reduced accordingly.

The information of the neighboring cell relation between the base stations in the service-related information may be directly acquired from the base station; the channel information of the user terminal UE in the service-related information may be acquired from the UE served by the base station through the base station. The various example embodiments describe the specific process of acquiring service-related information. The process of determining the configuration information of the BWP based on the service-related information will be described in greater detail below with reference to the drawings.

An example determination process for the number of BWPs in the configuration information is explained.

According to various embodiments, the configuration information may include the number of BWPs, and the service-related information includes the BWP class to be allocated;

In operation S602 above, the determining the configuration information of the BWP of the at least one base station based on the service-related information of the at least one base station may include, for example:

Determining the number of BWP classes to be allocated corresponding to at least one base station, as the number of BWPs of at least one base station.

For example, the number of the BWP classes in a base station may be equal to the configuration of the number of BWP classes, wherein, the number of BWP classes corresponding to the base station is determined based on the UE capability information of the base station and/or the service type of the base station.

Figure 9:
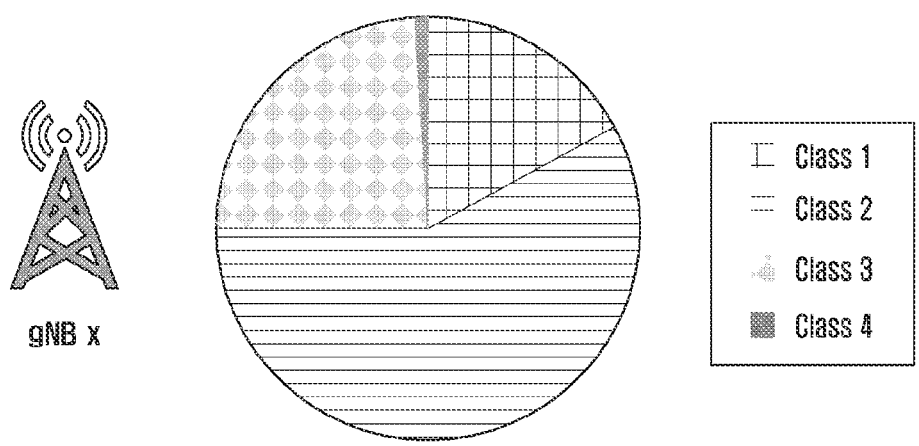
FIG. 9 is a diagram illustrating an example BWP class of a base station according to various embodiments.

For example, as illustrated in FIG. 9, a certain base station gNBx is configured with 4 BWP classes, class 1 to class 4, that is, the number of configured BWPs is 4.

The above example describes an example process for determining the number of BWPs in the configuration information of the BWP. The process for determining the bandwidth of the BWP in the configuration information of the BWP will be described in greater detail below with reference to the drawings.

According to various embodiments, the configuration information may include the bandwidth of the BWP, and the service-related information includes: the traffic amount corresponding to the BWP class to be allocated.

In operation S602 above, determining the configuration information of the BWP of the at least one base station based on the service-related information of the at least one base station may include, for example:

Determining the bandwidth corresponding to the at least one BWP in the at least one BWP class to be allocated of the at least one base station based on the traffic amount corresponding to the at least one BWP class to be allocated of the at least one base station.

For example, for each BWP class of each base station, the traffic amount of the BWP class is positively correlated with the bandwidth of the BWP class, for example, the predicted PRB usage is positively correlated with the bandwidth. For example, the predicted number of PRBs may be the bandwidth of the BWP.

Figure 10:
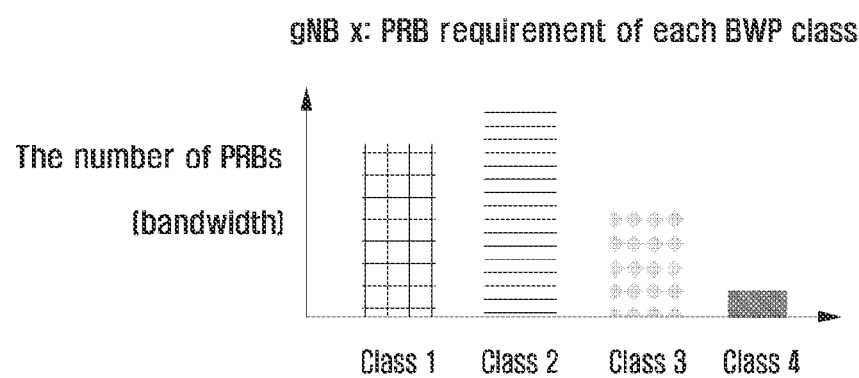
FIG. 10 is a diagram illustrating example bandwidth sizes corresponding to different BWP classes according to various embodiments.

As illustrated in FIG. 10, the predicted PRB usage of each BWP class (shown as the BWP class in the figure) is different, so their bandwidths are also different. The purpose of this is to allocate PRB resources on requirement so as to avoid unnecessary resource waste. Wherein, the predicted PRB usage may also be called the predicted PRB value, or the predicted number of PRBs, or PRB requirement.

Example embodiments above describe an example process of determining the bandwidth of the BWP in the configuration information of the BWP. An example process of determining the frequency location in the configuration information of the BWP will be described in greater detail below with reference to the drawings.

According to various embodiments, the configuration information may further include the frequency location of the BWP; the service-related information includes at least one of the following: the BWP class to be allocated, information of the neighboring cell relation between base stations, and the traffic amount corresponding to the BWP class to be allocated.

In operation S602 above, the determining the configuration information of the BWP of the at least one base station based on the service-related information of the at least one base station may include:

(1) determining an allocation priority of the BWP to be allocated of at least one base station based on at least one of the BWP class to be allocated, the information of the neighboring cell relation between the base stations, and the traffic amount corresponding to the BWP class to be allocated.

According to various embodiments, for a higher the allocation priority corresponding to the BWP, correspondingly the BWP is allocated preferentially.

For example, the determining the allocation priority of the BWP to be allocated of at least one base station based on at least one of the BWP class to be allocated, the information of the neighboring cell relation between the base stations, and the traffic amount corresponding to the BWP class to be allocated may include:

a. For each BWP to be allocated of at least one base station, acquiring at least one of the following priority information respectively: a class priority corresponding to the class of the BWP to be allocated, a location priority corresponding to the information of the neighboring cell relation between the base stations, and a priority of the traffic amount corresponding to the BWP class to be allocated.

b. Determining the allocation priority of the BWP to be allocated of at least one base station according to the acquired at least one of priority information.

For the BWP to be allocated with the same class priority, the location priority may be positively correlated to the allocation priority; and/or for the BWP to be allocated with the same location priority, the service priority may be positively correlated to the allocation priority.

For example, the priority of class priority is higher than the location priority, and the priority of location priority is higher than the service priority.

An example process of acquiring the priority information will be described in greater detail below.

(2) Based on the determined allocation priority, the frequency positions are sequentially configured for each BWP to be allocated.

For example, the frequency location of each BWP class may be determined in sequence according to the determined allocation priority, for example, the frequency location of the BWP class with a higher allocation priority is determined first.

The process of configuring frequency positions for each BWP to be allocated in sequence will be described in greater detail below.

An example acquisition process of priority information will be described in greater detail below with reference to the drawings.

For the class priority in the priority information:

According to various embodiments, acquiring the class priority corresponding to the class of the BWP to be allocated, may include:

Determining the class priority corresponding to the class of the BWP to be allocated according to the capability information and/or service type information of the UE corresponding to the class of the BWP to be allocated.

For example, the class priority corresponding to uRLLC may be higher than the class priority corresponding to eMBB; and/or the class priority corresponding to eMBB may be higher than the class priority corresponding to mMTC.

According to various embodiments, for the BWP classes to be allocated for the same service type, the size of the maximum bandwidth supported by the UE is positively correlated with the corresponding class priority.

For example, when the service types are the same, the larger the maximum bandwidth supported by the UE is, the higher the class priority is.

According to various embodiments, the bandwidth may be judged first to determine the class priority, and when the bandwidth is the same, the class priority is determined according to the service type.

For the location priority in the priority information:

According to various embodiments, acquiring the location priority corresponding to the information of the neighboring cell relation between the base stations, may include:

(1) for each BWP to be allocated of at least one base station, acquiring at least one of the number of neighboring cells of the base station corresponding to the BWP to be allocated, the number of UEs served by the base station, and the throughput of the base station based on the information of the neighboring cell relation between the base stations;

(2) determining a weight of the base station corresponding to the BWP to be allocated based on at least one of the number of neighboring cells, the number of UEs served by the base station, and the throughput of the base station; and (3) determining the location priority corresponding to the information of the neighboring cell relation between the base stations based on the weight of the base station corresponding to the BWP to be allocated.

For example, a global-based neighboring cell relation can be generated according to the information of the neighboring cell relation between at least one base station, that is, determining the number of neighboring cells of each base station.

Figure 11:
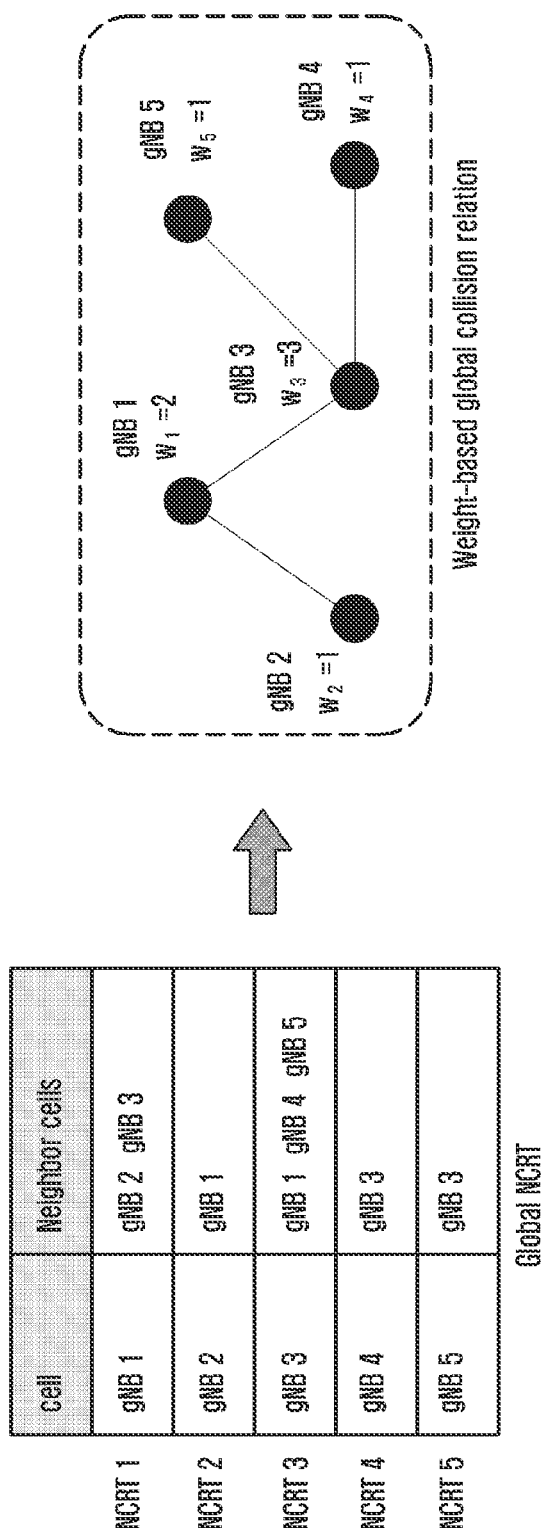
FIG. 11 is a diagram of neighboring cell relations of multiple base stations according to various embodiments.

As illustrated in FIG. 11, the figure contains the neighboring cell relation table (NCRT) of all cells. For base station gNB1, its neighboring cell relation includes base station gNB2 and base station gNB3 (see neighboring cell relation table 1 in the figure); for base station gNB2, Its neighboring cell relation includes base station gNB1 (see neighboring cell relation table 2 in the figure); for base station gNB3, its neighboring cell relation includes base station gNB1, base station gNB4, and base station gNB3 (see neighboring cell relation table 3 in the figure); for base station gNB4, its neighboring cell relation includes base station gNB3 (see neighboring cell relation table 4 in the figure); for base station gNB5, its neighboring cell relation includes base station gNB3 (see neighboring cell relation Table 5 in the figure).

For example, different weights reflect the importance of the base station; at least one of the number of neighboring cells, the number of UEs served by the base station, and the throughput is positively correlated with the weight; the weight of the base station is positively correlated with the corresponding location priority.

For example, for larger number of neighboring cells, number of UEs served by the base station, and throughput, the corresponding weight of the base station is larger.

For example, FIG. 11 illustrates an example of a global collision relationship based on weights, which may be defined, for example, as the number of neighboring cells of the base station. Since the number of neighboring cells of base station gNB1, base station gNB2, base station gNB3, base station gNB4, and base station gNB5 are 2, 1, 3, 1, 1, respectively, their weights are $w_1=2$, $w_2=1$, $w_3=3$, $w_4=1$, and $w_5=1$. The weight of the base station reflects the interference relationship with neighboring cells. The larger the weight is, the larger the number of interfering cells is.

For example, if the weight is defined as the number of UEs served by the base station, supposing that in a certain period of time, the number of access UEs of base station gNB1, base station gNB2, base station gNB3, base station gNB4, and base station gNB5 are 20, 12, 31, 12 and 12 respectively, then their weights are $w_1=20$, $w_2=12$, $w_3=31$, $w_4=12$, $w_5=12$. The weight of the base station reflects the number of service users. The larger the weight is, the larger the number of service users is.

For example, if the weight is defined as the throughput of the base station, supposing that in a certain period of time, the number of access UEs of base station gNB1, base station gNB2, base station gNB3, base station gNB4, and base station gNB5 are 20 M, 12 M, 30 M, 20 M, 32 M, respectively, then their weights are $w_1=20$, $w_2=12$, $w_3=30$, $w_4=20$, $w_5=32$. The weight of the base station reflects the load of the services, that is, the larger the weight is, the more service loads are.

For example, the weight of a base station may be positively correlated with the corresponding location priority, for example, the larger the weight of the base station is, the higher the location priority is; that is, in the case of the same class priority, the larger the weight of the base station is, the higher the corresponding allocation priority is.

For the traffic amount priority in the priority information:

According to various embodiments, acquiring the priority of the traffic amount may include:

Determining the corresponding traffic amount priority according to the traffic amount corresponding to the BWP class to be allocated.

For example, the traffic amount corresponding to the BWP class to be allocated may be positively correlated with the corresponding traffic amount priority, for example, the larger the traffic amount corresponding to the BWP class to be allocated is, the higher the traffic amount priority is.

For example, in the process of determining the allocation priority, the class priority may be first determined, and the BWP class with the highest allocation priority may be determined according to the service type and/or UE capability information; if the class priority is the same at this time, the location priority is further determined in the BWP classes with the same priority; at least one of the number of neighboring cells, the number of UEs served by the base station, and the throughput is positively correlated to the location priority; if the class priority and location priority are the same, the allocation priority is required to be further determined according to the priority of the traffic amount, that is, the larger the traffic amount at this time is, the higher the allocation priority is.

The above example embodiments describe an example process of acquiring priority information, and the process of determining the allocation priority based on the priority information will be described in greater below with reference to the accompanying drawings.

Sort at least one BWP class according to different BWP classes or UE capability information, that is, determine the class priority; when the BWP classes are the same, that is, when the class priorities are the same, then the allocation priority is determined according to the location priority, that is, sort different BWP classes according to the weight of the base station; when the class priority and location priority are the same, that is, when the BWP class and the weight of the base station are the same, the allocation priority is determined according to the priority of the traffic amount, that is, sort according to the predicted PRB usage.

Sort all the BWP classes in the SON server. The purpose of sorting is to preferentially process the service with high requirement.

① sorting according to the BWP class priority, for example, determining the class priority according to the BWP class: sorting according to the BWP class, such that the services with low latency requirements will be ranked first. If the first key is the same, then the second key is considered.

For example, all classes are sorted according to the priority of the service and the UE capability. Wherein, the service priority is uRLLC>eMBB>mMTC. The purpose of sorting here is to rank the high-requirement BWP classes first, which is beneficial to the priority processing of the base station.

Figure 12:
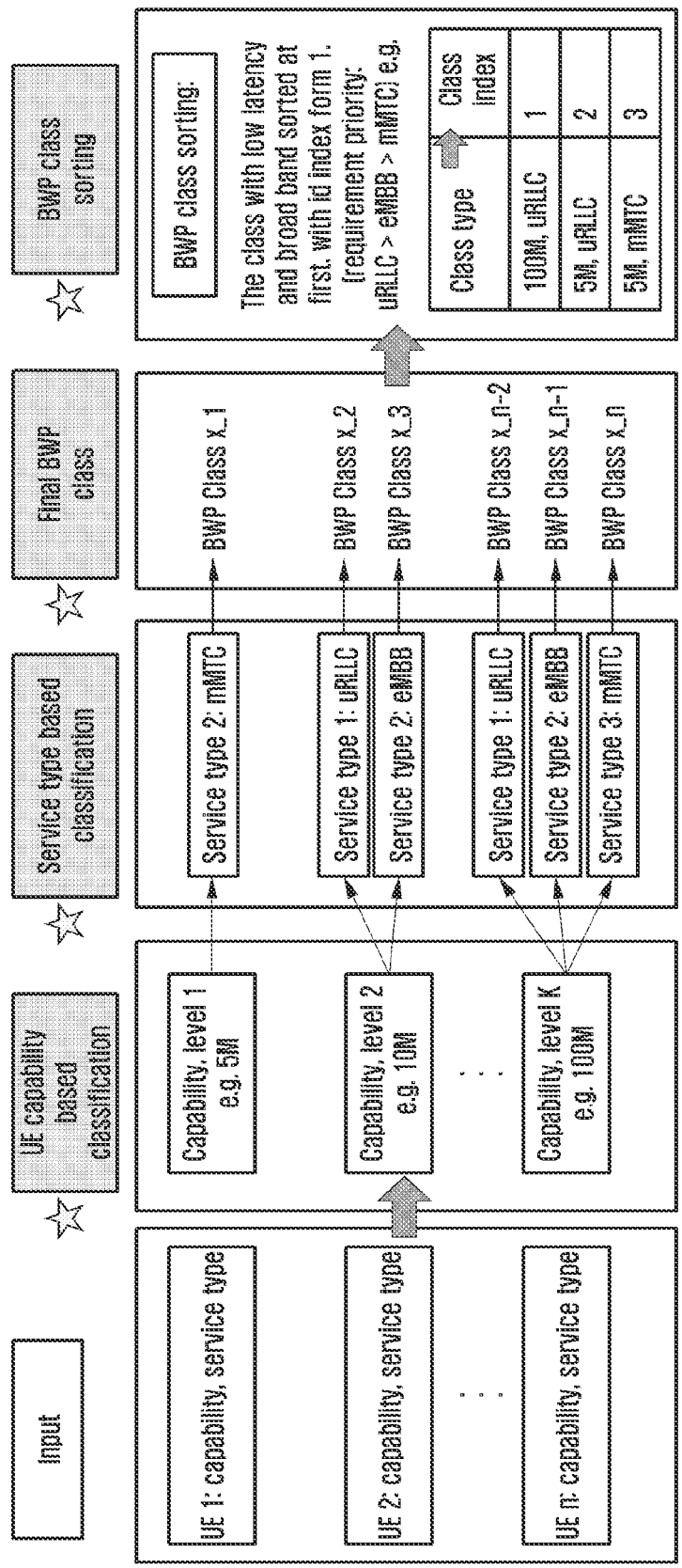
FIG. 12 is a diagram illustrating an example of sorting different BWP classes according to class numbers according to various embodiments.

As illustrated in FIG. 12, collect the capability and service type features of each UE; classify based on the UE capability, wherein the UE capability refers to the maximum bandwidth supported by the UE (for example, the maximum bandwidth supported by the IoT UE is 5 M, and the maximum bandwidth supported the mobile UE is 100 M), these UEs are divided into K classes, that is, K levels; then each UE of the same level is further classified based on the service type. The service type can be mMTC, uRLLC or eMBB; in this manner, each of the formed group forms the final BWP class (that is, the final BWP class shown in the figure), with a total of m BWP classes, in which each BWP class has the same UE capability and the same service type; finally, according to the priority of the service and the UE capability, and all classes are sorted. Wherein, the service priority (corresponding to the service requirement reference priority in the figure) is uRLLC>eMBB>mMTC. The purpose of sorting here is to rank the high-requirement BWP classes first, which is beneficial to the priority processing of the base station.

As illustrated in FIG. 12, the step of "BWP class sorting", for example, the sorting of the BWP classes, that is, determine the class priority, uRLLC>eMBB>mMTC. In the same service type, the supported bandwidth will be sorted from high to low, with 100 M first and 5 M second. Finally, allocate serial numbers to the BWP classes according to the arranged order, starting from 1 and increasing sequentially. In this way, low-latency, high-reliability, large bandwidth service (100 M uRLLC, such as real-time high-definition video live broadcast services) will be ranked first, with the serial number 1, followed by low-latency, high reliability, and small bandwidth service (5 M uRLLC, such as real-time remote control services), the serial number is 2, and the last is machine communication, small bandwidth service (5 M, mMTC, such as shared bicycle service), and the serial number is 3.

② according to the weight of the base station (also called weight value), sorting the BWP classes in descending order, that is, determining the location priority. The weight reflects the interference relationship between a base station and other surrounding base stations. Giving a priority to handle a complex base station can better reduce the complexity of the remaining network. If the second key is the same, then the third key is considered.

② sorting according to the PRB predicted value of the BWP class (corresponding to the number of PRBs in the figure), and preferentially processing the BWP class with high requirement, which is to determine the priority of the traffic amount, so as to better reduce the fragmentation of resource allocation. If the BWP class with low requirement is allocated first, the BWP class with high requirement for post-processing may not be able to allocate continuous resources, resulting in discontinuity in resource allocation.

The above are used to indicate the priority of sorting different BWP classes. The sorting is performed preferentially based on the first key, followed by the second key, and finally the third key. That is, the class priority has priority over the location priority, and the location priority has priority over the service priority.

As illustrated in FIG. 13, for a given BWP class table, its sorting process is shown in FIG. 13. The sorting is performed according to the class number, for example, the sorting is performed according to the priority of the BWP class, wherein the BWP class number reflects the class priority of the BWP class; when the BWP class number is the same, that is, in the same BWP class, the sorting is performed according to the weight of the base station (corresponding to the weight in the figure); when the BWP class and weight are the same, the sorting is performed according to the number of PRBs, that is, sort according to predicted PRB values.

The above example embodiments describe an example process of determining priority information. The process of determining the frequency location of the BWP according to the allocation priority will be described in greater detail below with reference to the accompanying drawings.

According to various embodiments, based on the determined allocation priority, sequentially configuring the frequency location for each BWP to be allocated, may include:

For the BWP to be allocated of at least one base station, based on the determined allocation priority, performing, in sequence, the following:

Configuring the frequency location for the BWP to be allocated based on the current available resource location set, and updating the current available resource location set based on the information of the neighboring cell relation between base stations.

For example, the frequency location of each BWP class is determined in sequence according to the determined allocation priority, that is, the frequency location of the BWP class with the high allocation priority is determined first.

For example, based on the current available resource location set, configuring frequency positions for the BWP to be allocated, and updating the current available resource location set based on neighboring cell relation information between base stations, may include:

a. Updating the current available resource location set of at least one base station based on the neighboring cell relation of the at least one base station.

For example, the updating the current available resource location set of at least one base station based on the neighboring cell relation of the at least one base station may include:

a1. Determining the current frequency resource location of the neighboring base station;

a2. Updating the available resource location set of the base station based on the current frequency resource location of the neighboring base station.

For example, before updating, determine the intersection between the available resource location set and the current frequency resource position set of the neighboring cells; then, after updating, the available resource location set is the available resource location set before the update minus the determined intersection.

b. Determining the frequency resource location of the BWP class of the base station based on the determined current available resource location set.

For example, the determination of the frequency location can be performed according to the following:

According to the BWP classes sorted above, searching for the frequency resource location for each class respectively, wherein for a base station, the available resource location of the BWP class is firstly updated according to the neighboring cell relation table of the base station:

① The current frequency resource location of the $i^{th}$ neighboring cell of the base station is recorded as Loc_RB_Neighboring_i; wherein i is a natural number;

② The available frequency resource location set of the base station is Loc_RB after updating=Loc_RB before updating −Loc_RB∩Loc_RB_Neighboring_i; wherein Loc_RB is the available frequency resource location set of the base station;

③ Repeat operations ① to ② until all neighboring cells are traversed;

④ If Loc_RB is empty or Loc_RB is full bandwidth, then set RB_start=Loc_RB; among them, RB_start is used to indicate; otherwise, if Loc_RB is not empty, then RB_start is the lowest frequency location of Loc_RB;

Repeating the above operations until all BWPs are traversed.

Figure 14:
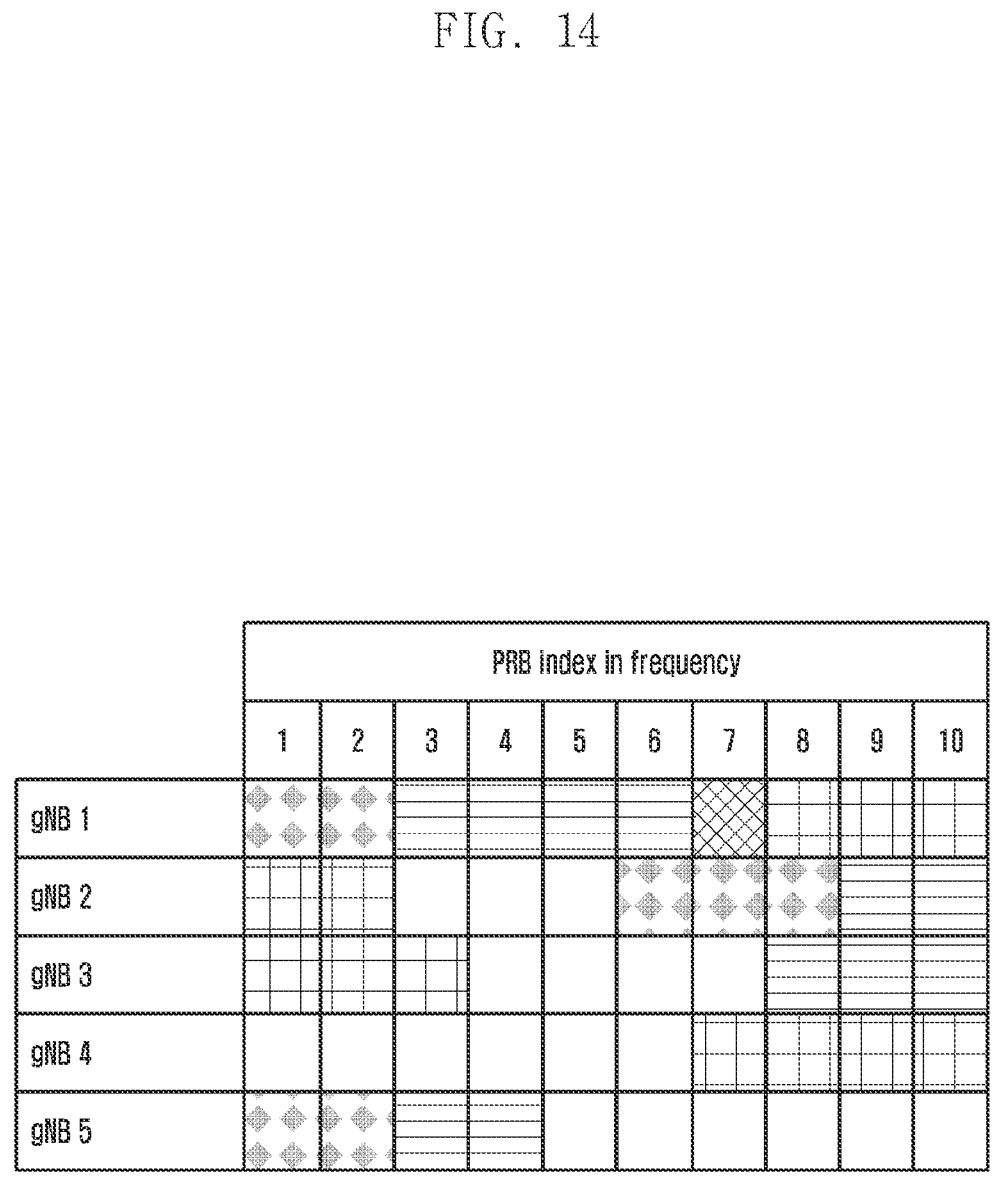

For example, in the above frequency location allocation process, among the available resource positions of the BWP class of the base station, low-frequency positions are preferentially allocated, which may make it easier to stagger the frequency location distribution when the base station is heavily loaded and resource requirement is high. In an example, the frequency allocation location as shown in FIG. 14 can be obtained.

Up to this point, the frequency allocation of the BWP classes has been completed, and the quantity, bandwidth and frequency location of the BWP classes have been determined. For example, as illustrated in FIG. 14:

The base station gNB1 has four BWP classes; the requirements for PRB are class 1=3, class 2=4, class 3=2, class 4=1; the frequency start positions are class 1=8, class 2=3, class 3=1, class 4=7 respectively.

The base station gNB2 has three BWP classes; the requirements for PRB are class 1=2, class 2=2, and class 3=3; the frequency start positions are class 1=1, class 2=9, and class 3=6.

The base station gNB3 has two BWP classes; the requirements for PRB are class 1=3, class 2=3, and the frequency start positions are class 1=1 and class 2=8.

The base station gNB4 has one BWP class; the requirements for PRB are class 1=4; the frequency start positions are class 1=7.

The base station gNB5 has two BWP classes; the requirements for PRB are class 2=2, class 3=2; the frequency start positions are class 2=3, and class 3=1.

In this operation, the frequency location determination is to stagger the resources as much as possible in frequency to reduce interference between adjacent cells.

The above example embodiments describe an example process of determining the frequency location in the configuration information of the BWP. The process of determining the power in the configuration information will be described in greater detail below with reference to the accompanying drawings.

For example, when the base station is heavily loaded and resource requirement is high, the power can be further adjusted to coordinate the resource allocation between the base stations.

According to various embodiments, the configuration information may include the power of the BWP; the service-related information includes at least one of the BWP class to be allocated, the information of the neighboring cell relation between the base stations, and the channel information of the UE served by the base station;

In operation S602 above, the determining the BWP configuration information of the at least one base station based on the service-related information of the at least one base station may include:

(1) If there is a collision between the frequency positions of at least two BWP classes, determining an overall collision value of at least two BWP classes that have a collision relationship;

For example, determining the overall collision value of at least two BWP classes that have a collision relationship may include:

a. For any of the at least two BWP classes with a collision relationship, determine the collision value between one BWP class and the corresponding collision BWP class based on a predefined collision relationship table;

The collision relationship table includes collision values between at least one BWP class and the corresponding collision BWP class.

As illustrated in FIG. 15, each collision value from class p to class q can be predefined in the collision relationship table.

It is understandable that the collision relationship between the two BWP classes is not equal. For example, for a type of eMBB service and a type of uRLLC service, eMBB has a large tolerance for uRLLC, but uRLLC has a small tolerance for eMBB.

b. Determining the overall collision value based on the collision values corresponding to the at least two BWP classes and the information of the neighboring cell relation between the base stations.

The server should coordinate BWP resources for multiple base stations to try to stagger the interference between the same frequency. If it is unavoidable, it can further quantify the collision between services and adjust the power of different BWPs.

For example, the quantitative formula for the overall collision degree of a certain BWP in the base station is:

$$C\_in\_T_i^p = \int_{nT}^{(n+1)T} \sum_{j \neq i}^{N\_BS} \sum_{q=1}^{4} \sum_{k=0}^{M_i^p} C_{i,p}^{j,q} * G_{ij} dt \quad (1)$$

Where, $C_{i,p}^{i,q}$ represents the collision between BWP class p in base station i and BWP class q in base station j; T is a statistical period, N_BS is the number of base stations, and $M_i^p$ is the PRB requirements of BWP class p in base station i; n is a natural number; where $G_{ij}$ is a matrix representation of the global neighboring cell relation table, and $G_{ij}$ is acquired based on the information of the neighboring cell relation between base stations.

Figure 16:
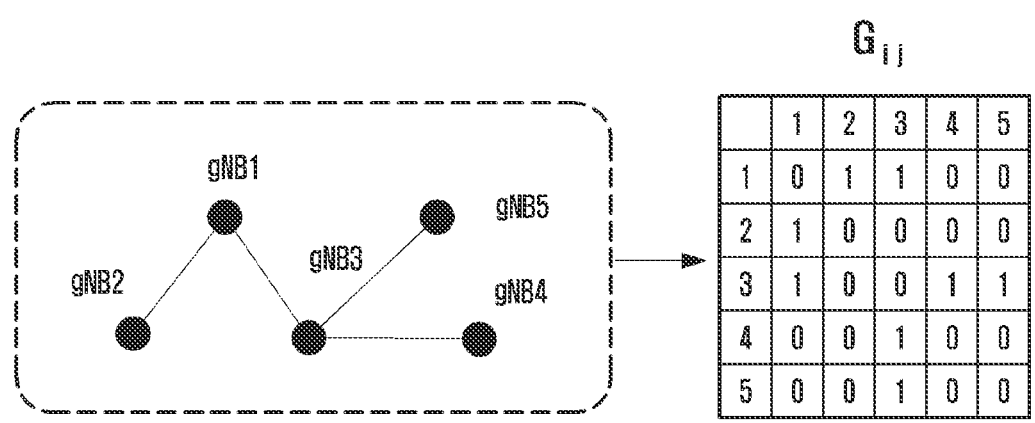
FIG. 16 is a diagram illustrating an example of a matrix representation of a global neighboring cell relation table according to various embodiments.

For $G_{ij}$, as illustrated in FIG. 16, if there is a neighboring cell relation between base station i and base station j, $G_{ij}=1$, otherwise $G_{ij}=0$.

(2) Determining the base station whose power is to be adjusted based on the channel information of the UE served by the base station.

For example, the determining the base station whose power is to be adjusted based on the channel information of the UE served by the base station may include:

a. Confirming the location distribution information of the UE based on the channel information of the UE;

b. Determining the central area range of the UE based on the determined location distribution information;

c. Setting the base station positioned in the central area as the base station whose power is to be adjusted.

For example, the location distribution information of the UE can be confirmed according to the channel information. If the channel quality is good, for example, the channel quality (e.g., SINR) is greater than a preset threshold, it can be judged that the corresponding UE is distributed in the center position; correspondingly, if the channel quality is poor, that is, the channel quality (e.g., SINR) is less than a preset threshold, it can be judged that the corresponding UEs are distributed at an edge region; in this manner, the BWP power of the base station at the center location can be reduced, and the BWP power at the edge region can remain unchanged.

Figure 17:
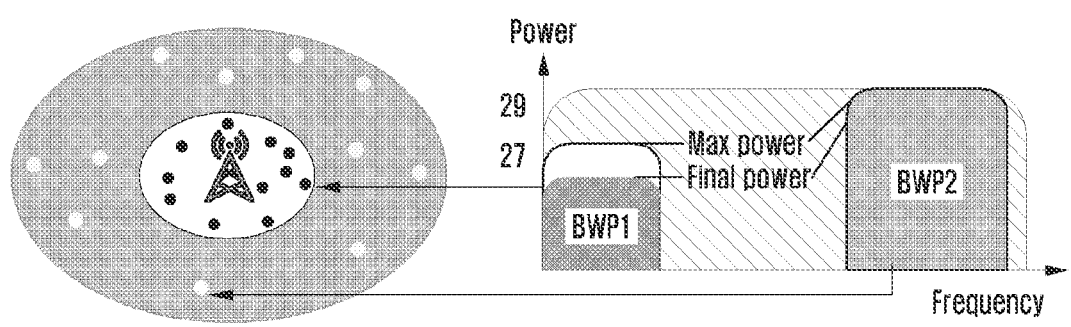
FIG. 17 is a diagram illustrating an example of reducing center power of a base station according to various embodiments.

As illustrated in FIG. 17, the maximum power in the figure is the maximum power for transmit that hardware has. Therefore, the final allocated BWP does not exceed the maximum power; the power of BWP2 at the edge region of the base station in the figure remains unchanged, that is, it still remains at the maximum power, however the BWP1 in the center of the base station can reduce the power to the final power determined according to the overall collision value. In this way, a part of the BWP will reduce the antenna transmit power and save the energy.

(3) Adjusting the power of the base station whose power is to be adjusted based on the determined overall collision value.

For example, the adjusting the power of the base station whose power is to be adjusted based on the determined overall collision value may include:

a. Determining the range of the overall collision value;

b. Adjusting the power of the base station whose power is to be adjusted to the power corresponding to the range.

For example, multiple thresholds can be set, and the range of the overall collision value is determined according to the set thresholds.

In an example embodiment, as illustrated in FIG. 18, after acquiring the overall collision degree C._in_T of the resource BWP, it further performs comparing the resource BWP with threshold 1, threshold 2, and threshold 3, and adjusting the corresponding antenna transmit power. For example, when C_in_T is less than the threshold 1, the transmit power of each antenna port is adjusted to 23. When C_in_T is greater than the threshold 1 and less than the threshold 2, the transmit power of each antenna port is adjusted to 25. When C_in_T is greater than the threshold 2 and less than the threshold 3, the transmit power of each antenna port is adjusted to 27, and when C_in_T is greater than the threshold 3, the transmit power of each antenna port is adjusted to 29. Wherein, when C_in_T is equal to threshold 1, it may not adjust the transmit power according to a predefined rule, or may adjust this to 23 or 25; when C_in_T is equal to threshold 2, it may adjust the transmit power to 25 or 27 according to the predefined rule; when C_in_T is equal to 3, the transmit power can be adjusted to 27 or 29 according to a predefined rule.

Figure 19:
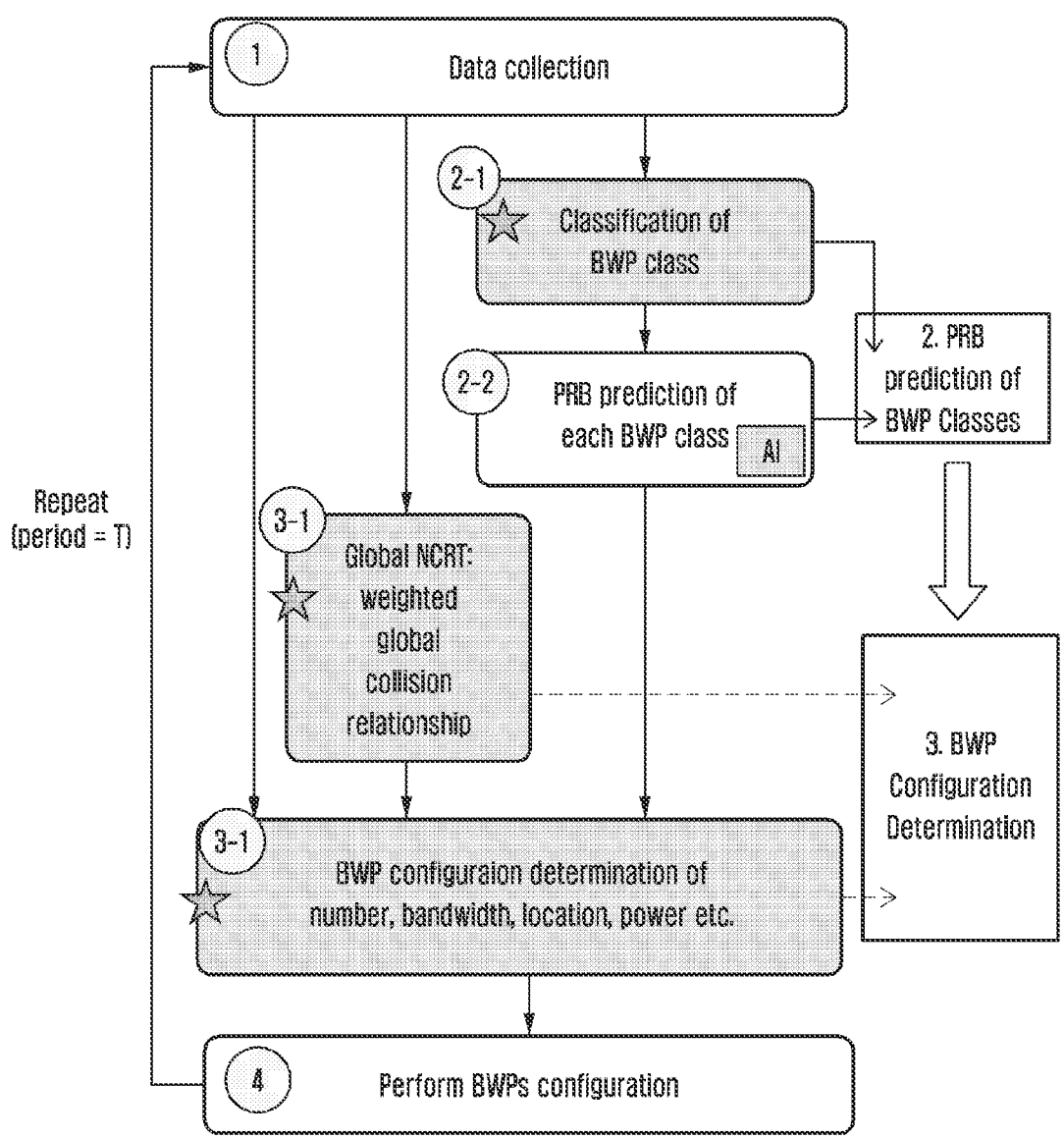
FIG. 19 is a flowchart illustrating an example BWP allocation method according to various embodiments.

In order to better understand the above BWP allocation method, an example of the BWP allocation according to various embodiments is described in greater detail below:

In an example, as illustrated in FIG. 19, the BWP allocation method may include the following operations:

1) Data collection: the server periodically collects the data of the base station, and then configures the BWP periodically, so that it can better adapt to dynamically changed service requirement;

2) PRB prediction of BWP class: the collected data will be used for BWP classification (e.g., BWP classification of the BWP classes), that is, BWP is classified to obtain at least one BWP class, and the traffic amount of each BWP class is predicted by the AI method (that is, predicting the PRB usage), that is, the PRB prediction for each BWP class;

3) BWP configuration determination: the server generates a global neighboring cell relation table (e.g., the weighted global collision relationship table), that is, the information of the neighboring cell relation between base stations, and the server configures the BWP according to the collected channel information, the neighboring cell, the BWP class, and the predicted service. The configuration information of BWP includes four parts: number of BWPs, the bandwidth of each BWP, the frequency location and power of each BWP;

4) performing BWP configuration: each base station receives and executes the configuration information the BWP of the server.

The above process can be repeated according to period=T.

Figure 20:
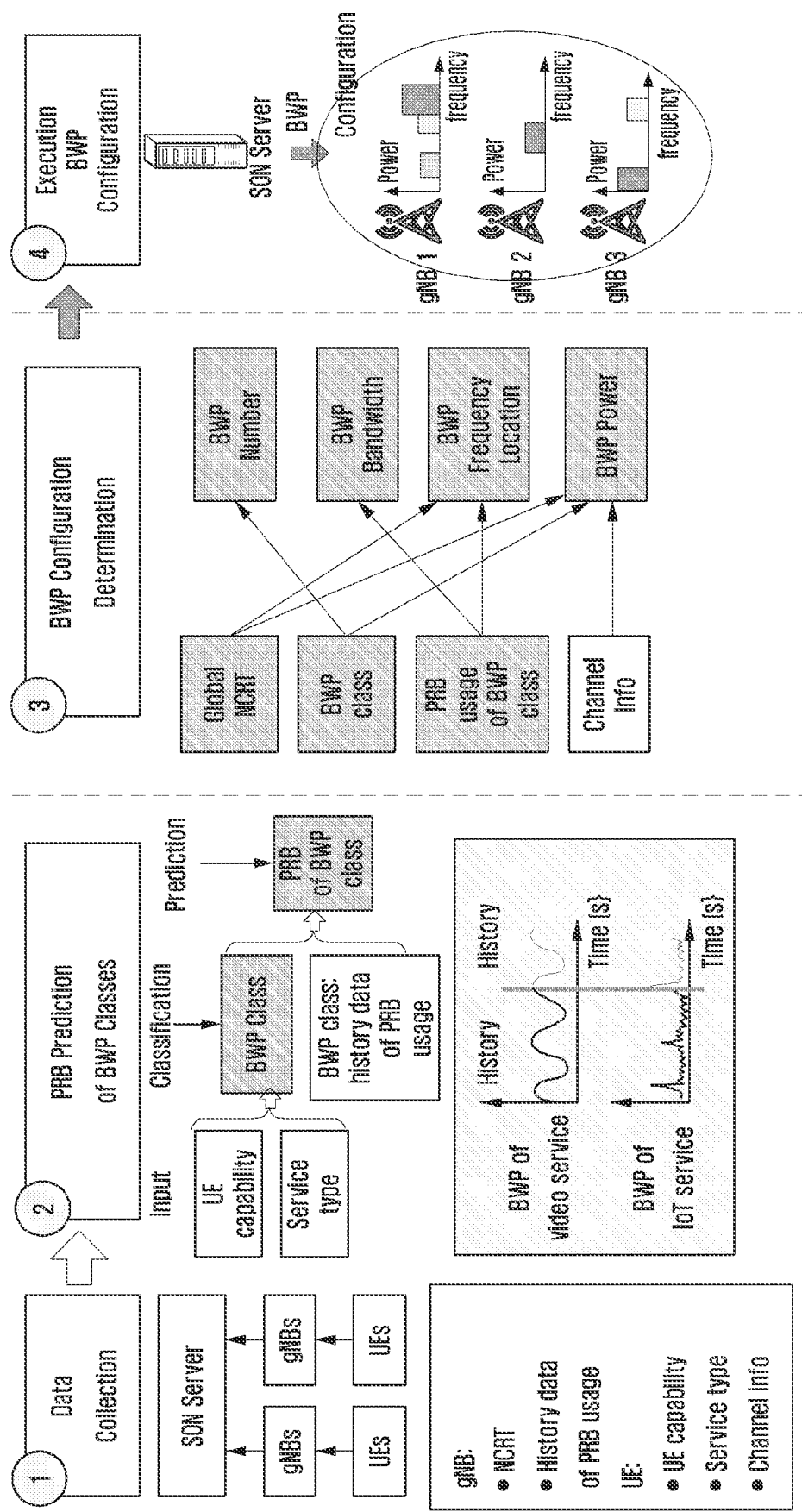
FIG. 20 is a flowchart illustrating an example BWP allocation method according to various embodiments.

In order to better understand the above BWP allocation method, another example of the BWP allocation is described in greater detail below:

In an example, as illustrated in FIG. 20, in the BWP allocation method, the SON server allocates dynamic BWP resources to different base stations based on the requirement prediction. The method may include the following steps:

1) Data collection:

The SON server collects the neighboring cell relation (e.g. neighboring cell relation information) of the base station from the 5G base station gNB, as well as the traffic amount, that is, the history information of the PRB usage; wherein, the information of the neighboring cell relation can be presented in various forms, such as a neighboring cell relation table, a neighboring cell relationship graph, etc., and in general, the neighboring cell relation in a 5G base station is presented in the form of neighboring cell relation tables; the SON server collects UE capability, service types and channel information from the 5G base station gNB; wherein the SON server refers to network function modules of multiple base stations for simultaneously controlling or coordinating multiple base stations;

2) Traffic amount prediction in the BWP class, that is, to predict the PRB usage of the BWP class:

By processing the UE capabilities and service types, the UE capabilities and service types are classified into different BWP classes; then based on the history data of the PRB usage of each BWP class, that is, the history PRB usage, the PRB usage is predicted so as to obtain the PRB requirement of each BWP class in the following time period, and the predicted PRB usage of each BWP class (e.g., the BWP of the video service and the BWP of the IoT service) is acquired to predict the future PRB usage using the history data so as to obtain the BWP's requirement for PRB; in other words, the future PRB usage can be predicted through UE capabilities, service types and history PRB utilization, so as to obtain BWP's requirement for the PRB;

3) BWP configuration determination:

According to the neighboring cell relation of each base station, the SON server generates a global neighboring cell relation table; then determines or calculates the number of BWPs, bandwidth, frequency position, and power of each base station, specifically:

The number of BWP classes is the number of BWP of a base station;

Determining the bandwidth of this BWP according to the needs of the BWP class for PRB;

Determining the frequency location of the BWP according to the global neighboring cell relation table, BWP class, and the needs of the BWP class for PRB (corresponding to the PRB usage of the BWP class in the figure);

Determining the power of the BWP according to the global neighboring cell relation table, BWP class and channel information.

4) Performing:

The SON server finally delivers the configuration information of the BWP to each base station, and the base station configures each BWP.

It can be seen from the above that the SON server can consider the neighboring relationship between base stations, classify similar service features and same UE capabilities into one type for processing, and periodically update and configure them, which can satisfy the requirements of different services and different user capabilities, and adapt to the service features that change with time. The SON allocates time-varying number of BWPs, time-varying BWP bandwidth, time-varying BWP frequency positions, and time-varying BWP power to each base station, thereby improving the network throughput and reduce the energy consumption.

The above BWP allocation method updates the configuration information by considering the neighboring relationship between base stations, which can meet the needs of different services and different user capabilities, and can adapt to the service features that change with time, allocating time-varying BWP configuration information to each base station, which can improve the network throughput and reduces the energy consumption.

Furthermore, for the changeable service requirement, the bandwidth of the BWP can be dynamically adjusted, such that the allocated bandwidth can be well adapted to the user requirement, so that the energy can be saved for low user requirement, and the throughput can be provided for high user requirement.

Furthermore, for the changeable user location distribution, the power of the BWP can be dynamically adjusted, so that the allocated power can better cover the user's area, and reduce the power in the area where there are no users, that is, to reduce a coverage area, which can save energy consumption for a base station.

Furthermore, for users moving between cells, the bandwidth and frequency positions between the BWPs between base stations can be dynamically coordinated, so that the coordinated scheduling between the base stations can be ensured, the user's service requirement can be ensured, and overall throughput of the system can be improved.

The BWP allocation method according to various embodiments will be described in greater detail below with reference to the drawings.

Figure 21:
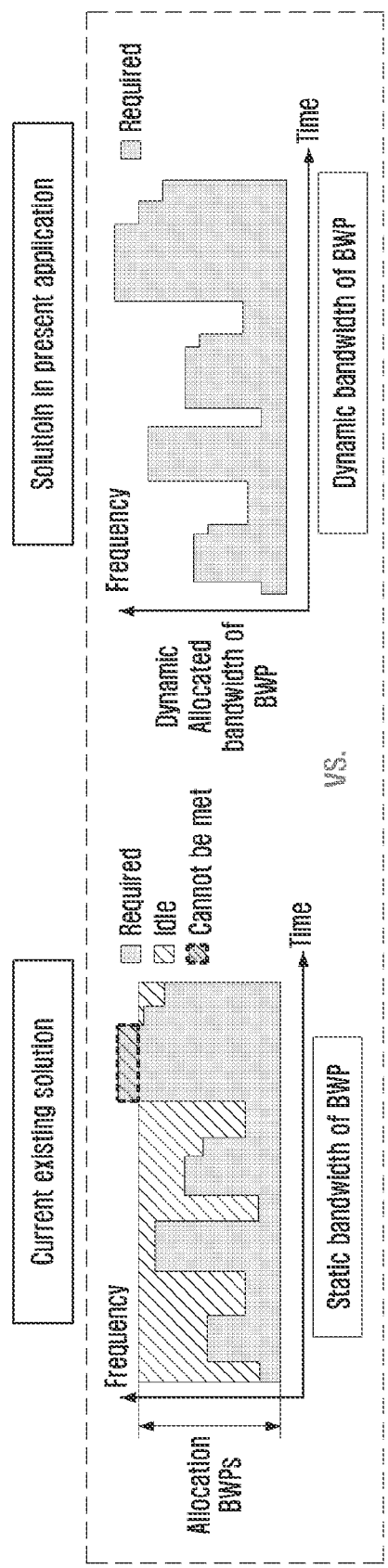
FIG. 21 is a diagram illustrating an example of the effect of the BWP allocation method according to various embodiments.

As illustrated in FIG. 21, for the changeable service requirement, various embodiments can dynamically adjust the bandwidth of BWP, so that the allocated bandwidth can be well adapted to the user's requirement, so that the energy can be saved when the user's requirement is low and provide throughput when the user's requirement is high.

Figure 22:
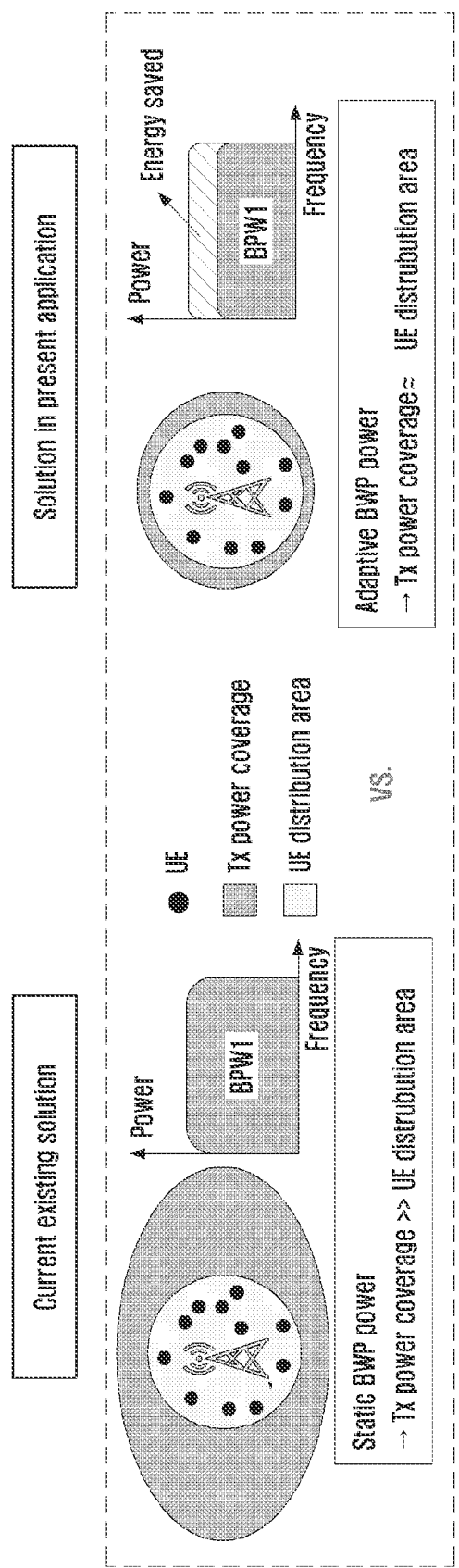
FIG. 22 is a diagram illustrating an example of the effect of the BWP allocation method according to various embodiments.

As illustrated in FIG. 22, in the existing method, the BWP power is statically allocated, that is, the power of the BWP is fixed. The statically-allocated BWP power makes the transmit power coverage area much larger than the distribution area of the UE, which causes the base station to lose more power consumption; for the changeable user location distribution, the power of BWP can be dynamically adjusted using various embodiments, so that the allocated power can better cover the user area, and reduce the power in the areas without users, that is, to reduce the coverage area, i.e., adjusting the BWP power adaptively to make the transmit power coverage match the distribution area of the UE, so that the base station energy consumption can be saved.

Figure 23:
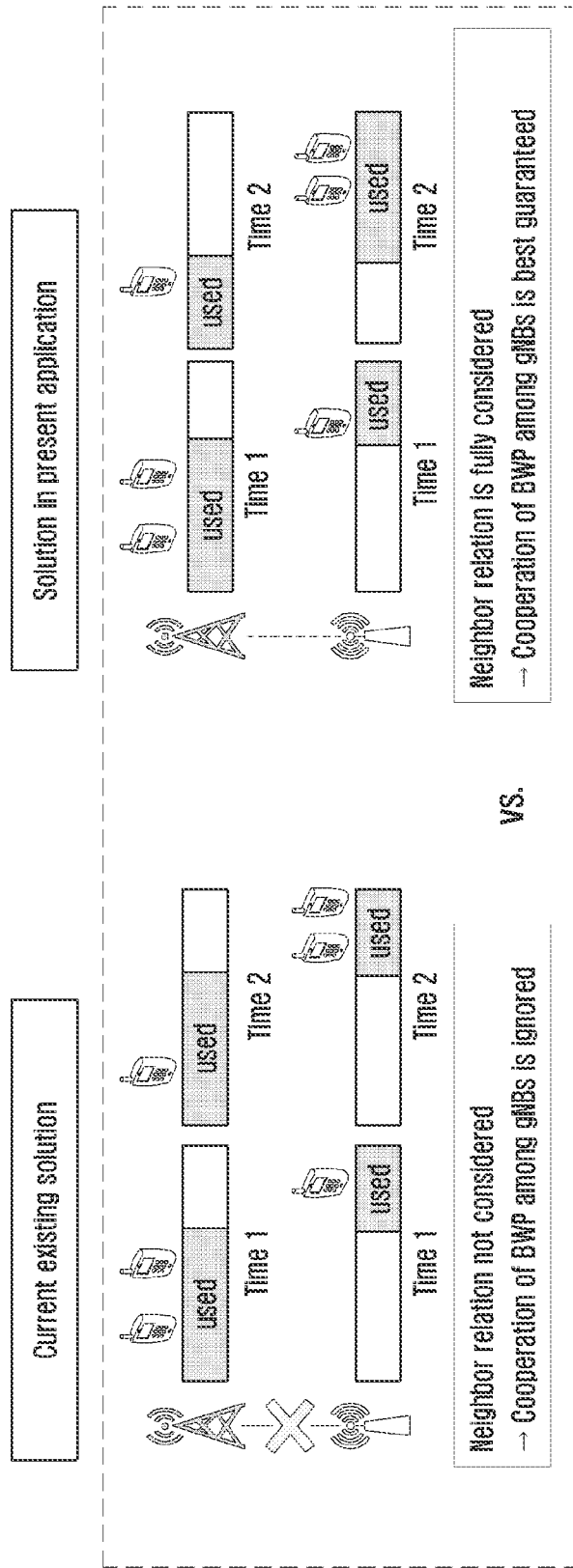
FIG. 23 is a diagram illustrating an example of the effect of the BWP allocation method according to various embodiments.

As illustrated in FIG. 23, the existing method does not consider the neighboring cell relation, that is, does not consider the information of the neighboring cell relation between the base stations, which makes it easy to ignore the BWP cooperation between the base stations. For example, in the existing method in FIG. 23, at time 1 and time 2, when the number of UEs served by the two base stations changes, the bandwidth and frequency location of the BWP of the base station are still fixed, which may not be able to guarantee the user's service requirement and may also cause energy loss; however, for the users moving between the base stations can dynamically coordinate the bandwidth and frequency locations of the BWPs between the base stations using various embodiments. That is, as the number of UEs served by the base station changes, the bandwidth and frequency location of the BWP can be changed at different times, such that the neighboring cell relation can be fully considered, the BWP cooperation between base station can be ensured, the user's service requirements are ensured, and the overall throughput of the system is improved.

Figure 24:
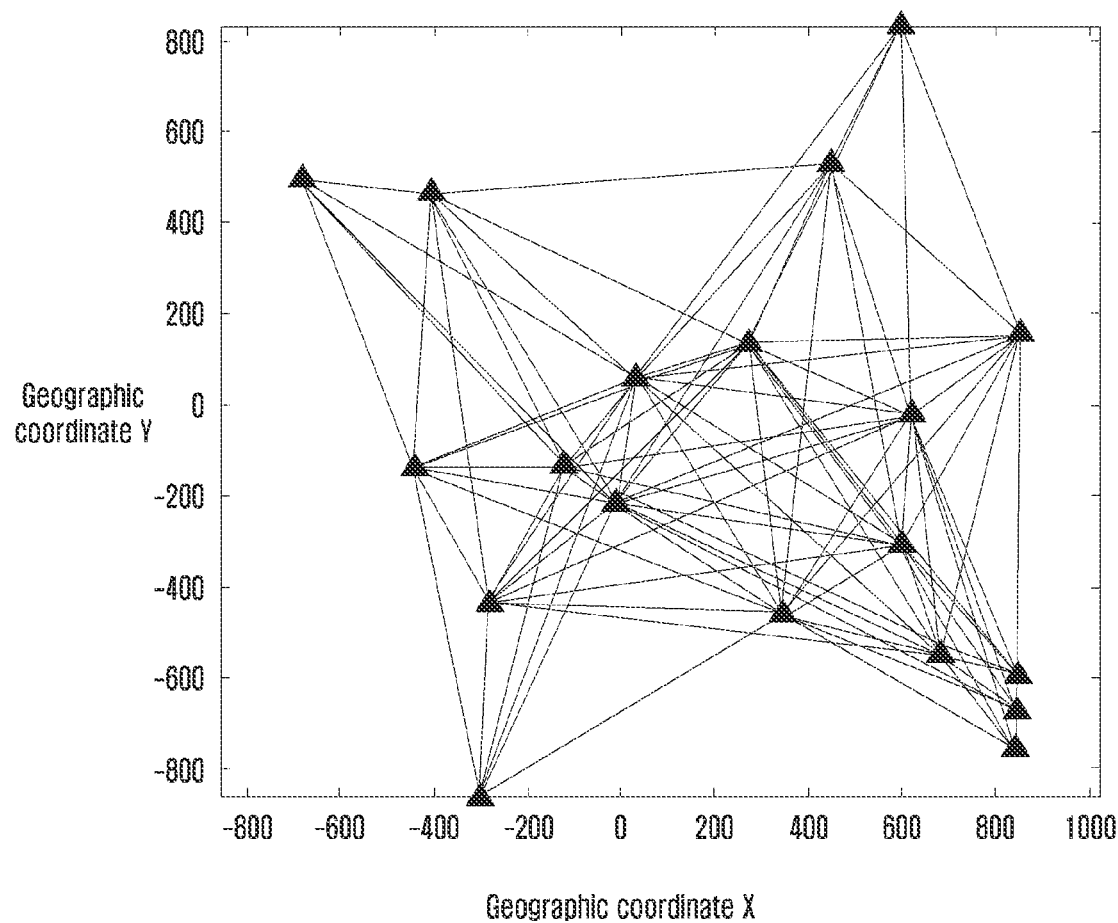
FIG. 24 is a diagram illustrating an example of the effect of the BWP allocation method according to various embodiments.

As illustrated in FIG. 24, the figure illustrates a simulation example. In one area, some base stations are randomly distributed, and their neighboring cell relations are represented by connecting lines.

Figure 25:
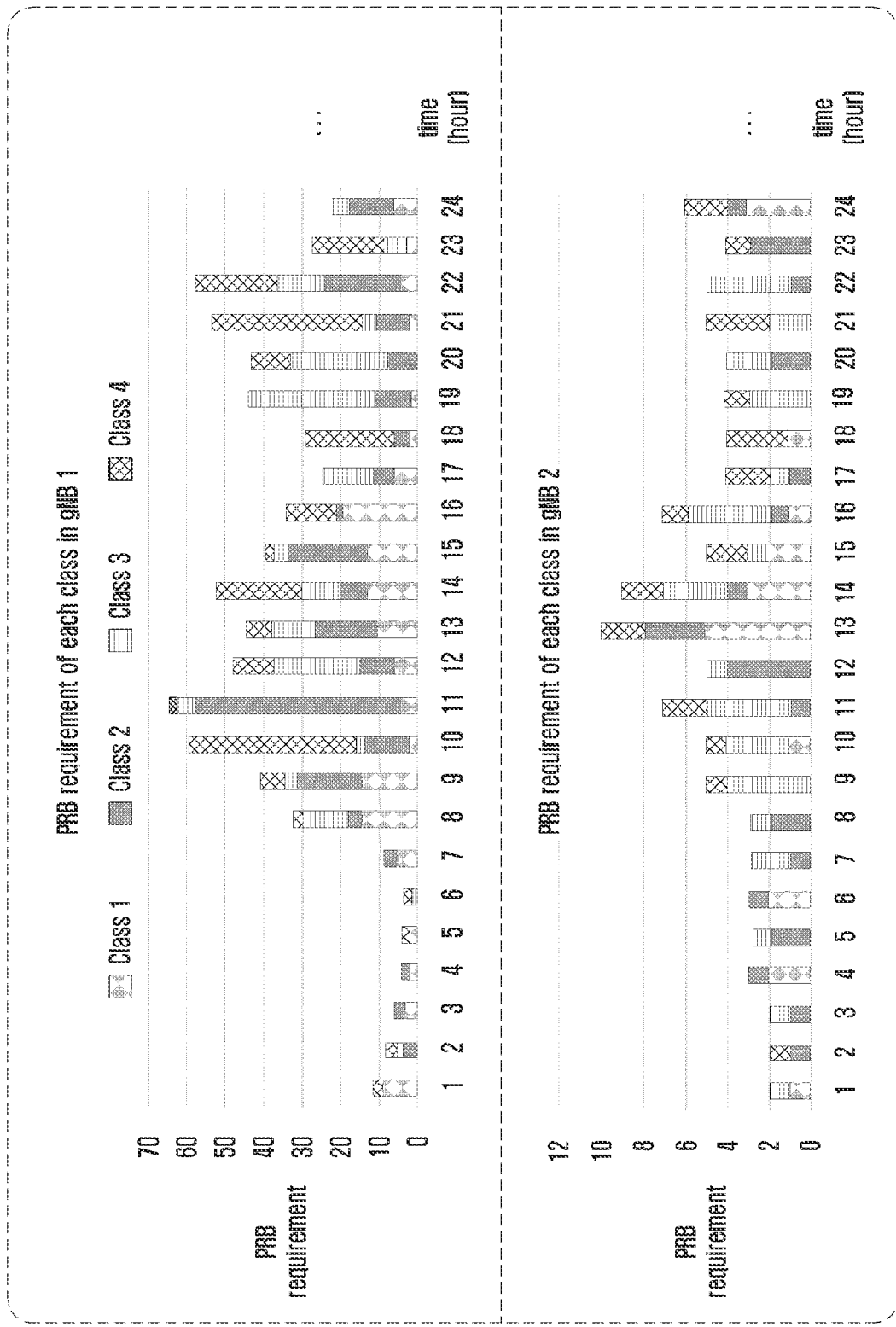
FIG. 25 is a diagram illustrating an example of the effect of the BWP allocation method according to various embodiments.

In the network illustrated in FIG. 24, UEs with different capabilities are randomly distributed, and they generate different service types. Then BWP classification is performed on these data, and each base station can get different BWP classes. Here, only the distribution of the PRB requirements for the BWP classes of the two base stations is provided, as illustrated in FIG. 25. The PRB requirements of each BWP class are different within 24 hours.

Figure 26:
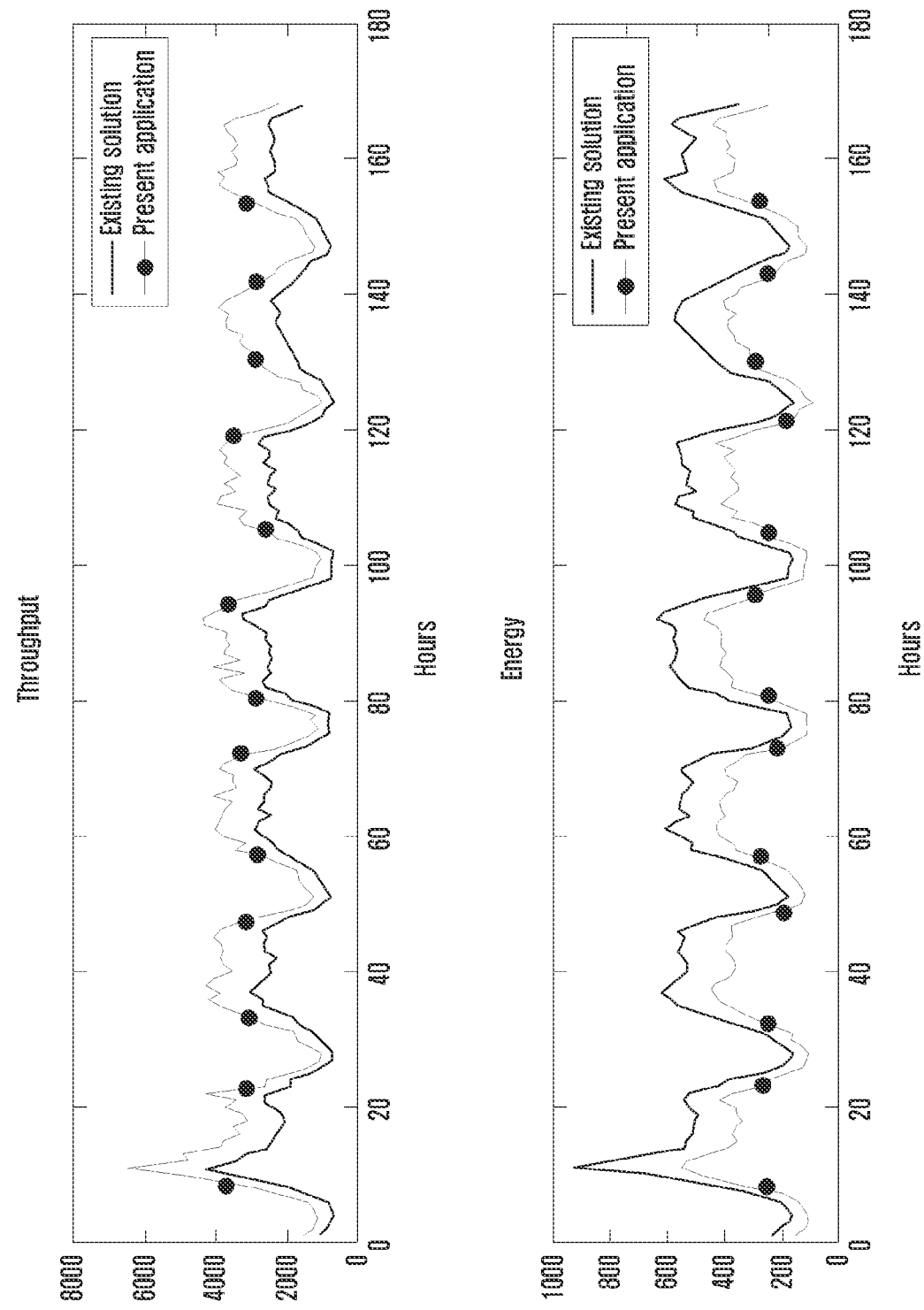
FIG. 26 is a diagram illustrating an example of the effect of the BWP allocation method according to various embodiments.

As illustrated in FIG. 26, through simulation, various embodiments can increase the weekly overall network throughput by about 45%, and reduce the weekly energy consumption of the base station by about 30%.

Figure 27:
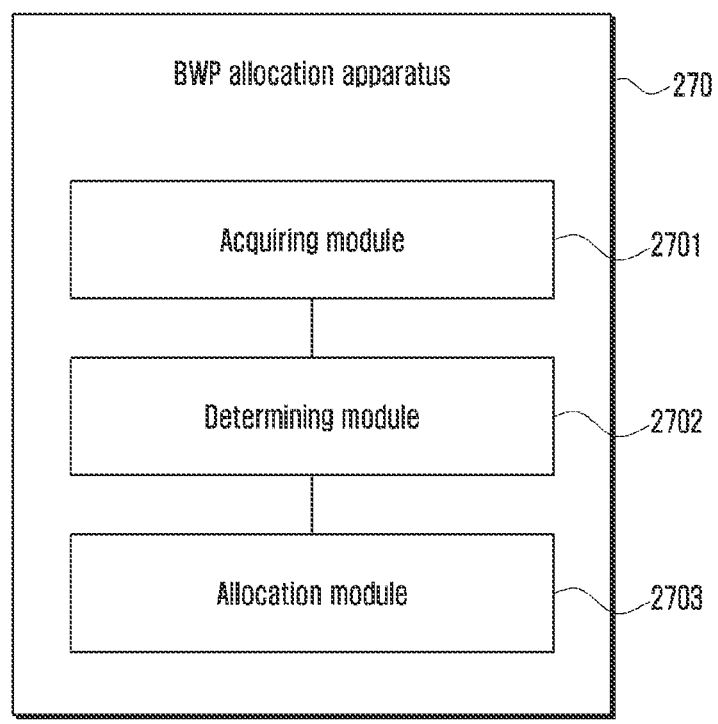
FIG. 27 is a block diagram illustrating an example configuration of a BWP allocation device according to various embodiments.

According to an embodiment, the simulation introduces the BWP allocation method from the perspective of the method flow, and the following introduces the method from the perspective of a virtual device, which is illustrated as follows:

An embodiment provides a BWP allocation apparatus 270. As illustrated in FIG. 27, the apparatus 270 may include an acquiring module (e.g., including processing circuitry and/or executable program elements) 2701, a determining module (e.g., including processing circuitry and/or executable program elements) 2702, and an allocation module (e.g., including processing circuitry and/or executable program elements) 2703.

An acquiring module 2701 may include various processing circuitry and/or executable program elements and be configured to acquire service-related information of at least one base station;

A determining module 2702 may include various processing circuitry and/or executable program elements and be configured to determine configuration information of BWP of the at least one base station based on the service-related information of the at least one base station; and An allocation module 2703 may include various processing circuitry and/or executable program elements and may be configured to configure the BWP of the at least one base station according to the configuration information.

According to various embodiments, the service-related information may include at least one of the following:

BWP class to be allocated;

traffic amount corresponding to the BWP class to be allocated;

information of neighboring cell relation between base stations; and channel information of a user terminal (UE) served by a base station.

According to various embodiments, when the acquiring module 2701 acquires the BWP class to be allocated of at least one base station, may be further configured to:

classify UEs served by the at least one base station according to capability information and/or service type information of the UEs served by the at least one base station; and determine the BWP class to be located of the at least one base station based on the classification result of the UEs.

According to various embodiments, the capability information of the UE may include a maximum bandwidth supported by the UE; and/or the service type of the UE includes at least one of the following: massive Machine Type Communications (mMTC), ultra-Reliable and Low Latency Communications (uRLLC) or enhanced Mobile Broadband (eMBB).

According to various embodiments, when the acquiring module 2701 acquires the traffic amount corresponding to the BWP class to be allocated of at least one base station, may be further configured to:

acquire history traffic amount of at least one BWP class to be allocated of the at least one base station; and predict the traffic amount of the at one BWP class to be allocated of the at least one base station according to the history traffic amount of the at least one BWP class to be allocated of the at least one base station.

According to various embodiments, the traffic amount is a physical resource block PRB usage.

According to various embodiments, the configuration information includes number of BWPs, and the service-related information includes the BWP class to be allocated;

when the determining module 2702 determines BWP configuration information of the at least one base station based on the service-related information of the at least one base station, it may be further configured to:

determine the number of BWP classes to be allocated corresponding to at least one base station, as the number of BWPs of the at least one base station.

According to various embodiments, the configuration information includes the bandwidth of the BWP; the service-related information includes the traffic amount corresponding to the BWP class to be allocated;

when determining the configuration information of the BWP of the at least one base station based on the service-related information of the at least one base station, the determining module 2702 may be further configured to:

determine the bandwidth corresponding to the at least one BWP in the at least one BWP class to be allocated of the at least one base station based on the traffic amount corresponding to the at least one BWP class to be allocated of the at least one base station.

According to various embodiments, the configuration information includes frequency location of the BWP; and the service-related information includes at least one of: the BWP class to be allocated, information of the neighboring cell relation between base stations and the traffic amounts corresponding to the BWP class to be allocated;

When determining the BWP configuration information of the at least one base station based on the service-related information of the at least one base station, determining module 2702 may be further configured to:

determine an allocation priority of the BWP to be allocated of the at least one base station, based on at least one of the BWP class to be allocated, the information of the neighboring cell relation between the base stations, and the traffic amount corresponding to the BWP class to be allocated; and sequentially configure frequency positions for the BWPs to be located based on the determined allocation priorities.

According to various embodiments, when the determining module 2702 determines an allocation priority of the BWP to be allocated of the at least one base station based on at least one of the BWP class to be allocated, the information of the neighboring cell relation between the base stations, and the traffic amount corresponding to the BWP class to be allocated, the determining module 2702 may be further configured to:

for each BWP to be allocated of the at least one base station, respectively acquire at least one of the following priority information: a class priority corresponding to a class of a BWP to be allocated, a location priority corresponding to information of neighboring cell relation between the base stations, and a priority of a traffic amount corresponding to the BWP class to be allocated; and determine the allocation priorities of the BWP to be allocated of the at least one base station according to the acquired at least one of priority information.

According to various embodiments, a class priority corresponding to uRLLC is higher than a class priority corresponding to eMBB; and/or a class priority corresponding to eMBB is higher than a class priority corresponding to mMTC; and/or for the BWP class to be allocated for the same service type, a maximum bandwidth supported by the UE is positively correlated with the corresponding class priority.

According to various embodiments, when the determining module 2702 acquires the location priority corresponding to the information of the neighboring cell relation between the base stations, the determining module 2702 may be further configured to:

for each BWP to be allocated of the at least one base station, based on the information of the neighboring cell relation between the base stations, acquire at least one of: number of neighboring cells of the base station corresponding to the BWP to be allocated, number of UEs served by the base station, and a throughput of the base station;

determine a weight of the base station corresponding to the BWP to be allocated based on at least one of the number of neighboring cells, the number of UEs served by the base station, and the throughput of the base station;

determine a location priority corresponding to the information of the neighboring cell relation between the base stations, based on the weight of the base station corresponding to the BWP to be allocated.

According to various embodiments, the at least one of the number of neighboring cells, the number of UEs served by the base station, and the throughput is positively correlated with the weight; and/or the weight of the base station is positively correlated with the corresponding location priority.

According to various embodiments, the traffic amount corresponding to the BWP class to be allocated is positively correlated with the corresponding traffic amount priority.

According to various embodiments, for the BWP to be allocated with the same class priority, the location priority is positively correlated with the allocation priority; and/or for the BWP to be allocated with the same location priority, the service priority is positively correlated with the allocation priority.

According to various embodiments, when the determining module 2702 sequentially configures frequency positions for each BWP to be allocated based on the determined allocation priority, the determining module 2702 may be further configured to:

for the BWP to be allocated of at least one base station, based on the determined allocation priority, sequentially performing the following:

configuring a frequency location for the BWP to be allocated based on a current available resource location set, and updating the current available resource location set based on the information of the neighboring cell relation between the base stations.

According to various embodiments, the configuration information includes a BWP power; the service-related information includes a BWP class to be allocated, information of neighboring cell relation between base stations, and channel information of the UE served by the base station;

When determining the BWP configuration information of the at least one base station based on the service-related information of the at least one base station, the determining module 2702 may be further configured to:

if there is a collision between the frequency positions of at least two BWP classes, determine an overall collision value of the at least two BWP classes with a collision relationship;

determine the base station whose power is to be adjusted based on the channel information of the UE served by the base station; and adjust the power of the base station whose power is to be adjusted based on the determined overall collision value.

According to various embodiments, when determining the overall collision value of at least two BWP classes that have a collision relationship, the determining module 2702 may be further configured to:

for at least two BWP classes with a collision relationship, respectively determine the collision value between the at least two BWP classes and the corresponding collision BWP classes based on a predefined collision relationship table;

wherein, the collision relationship table includes collision values between at least one BWP class and the corresponding collision BWP class;

determine the overall collision value based on the collision values corresponding to the at least two BWP classes and the information of neighboring cell relation between the base stations.

According to various embodiments, when the determining module 2702 determines the base station whose power is to be adjusted based on the channel information of the UE served by the base station, the determining module 2702 may be further configured to:

determine the location distribution information of the UE based on the channel information of the UE;

determine a central area range of the UE based on the determined location distribution information; and set the base station positioned in the central area range as the base station whose power is to be adjusted.

According to various embodiments, when the determining module 2702 adjusts the power of the base station whose power is to be adjusted based on the determined overall collision value, the determining module 2702 may be further configured to:

determine a range of the overall collision value; and determine the power of the base station whose power is to be adjusted as the power corresponding to the range.

According to various embodiments, when the allocation module 2703 configures the BWP to be allocated of at least one base station according to the configuration information, the allocation module 2703 may be further configured to:

transmit the determined configuration information to the corresponding base station, such that the corresponding base station correspondingly allocates the BWP based on the received configuration information.

The above BWP allocation device updates the configuration information by considering the service-related information of each base station, which can meet the needs of different services and different user capabilities, and can adapt to the service features that change over time, and assign each base station with time-varying BWP configuration information, which improves network throughput and reduces energy consumption.

Furthermore, in response to changeable service requirement, the BWP bandwidth can be dynamically adjusted, so that the allocated bandwidth can be well adapted to user needs, energy can be saved for low user requirement, and throughput can be provided for high user requirement is high.

Furthermore, for changeable user location distribution, the power of the BWP can be dynamically adjusted, so that the allocated power can better cover users, and reduce the power in areas where there are no users, that is, reduce the coverage area, which can save base station energy consumption.

Furthermore, for users moving between cells, the bandwidth and frequency positions between the BWPs among base stations can be dynamically coordinated, so that the coordinated scheduling between base stations can be ensured, the user's service needs can be guaranteed, and the overall throughput of the system can be improved.

The apparatus for allocating BWP of various embodiments can execute a method for allocating BWP provided by various example embodiments, and the implementation principles are similar. In the devices for allocating BWP in various embodiments, the actions performed by each module of the may correspond to the operations in the method for allocating the BWP in various embodiments. For the detailed function description of each module of the apparatus for allocating the BWP of the picture, it may be referred to the above description in the method for allocating BWP of the corresponding figures, and will not be repeated hereinafter.

The above is an introduction to the BWP allocation apparatus provided by the embodiment of the present application from the perspective of functional modularity. An electronic device provided by various embodiments will be described from the perspective of hardware, and the computing system of the electronic device will be introduced at the same time.

Based on the same principle as the method shown in various embodiments, an electronic device is also provided in various embodiments. The electronic device may include, but is not limited to: a processor and a memory; and the memory is used to store computer operation instructions; the processor is used to execute the BWP allocation method shown in the embodiment by calling the computer operation instructions. Compared with the prior art, the BWP allocation method in various embodiments can meet the requirements of different services and different user capabilities, improve a network throughput, and reduce an energy consumption.

Figure 28:
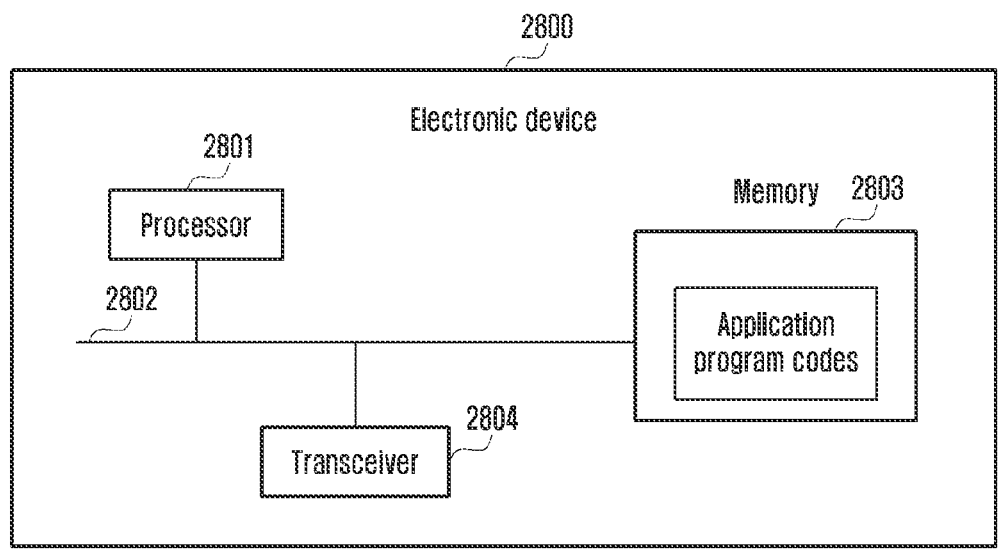
FIG. 28 is a block diagram illustrating an example configuration of an example electronic device according to various embodiments.

In an embodiment, an electronic device is provided. As illustrated in FIG. 28, the electronic device 2800 shown in FIG. 28 includes a processor (e.g., including processing circuitry) 2801 and a memory 2803. Wherein, the processor 2801 and the memory 2803 are connected, for example, via a bus 2802. Optionally, the electronic device 2800 may further include a transceiver (e.g., including transceiving circuitry) 2804. It should be noted that in actual applications, the transceiver 2804 is not limited to one, and the structure of the electronic device 2800 is merely a non-limiting example.

The processor 2801 may include various processing circuitry, such as, for example, and without limitation, a CPU (Central Processing Unit), a general-purpose processor, a DSP (Digital Signal Processor), an ASIC (Application Specific Integrated Circuit), FPGA (Field Programmable Gate Array) or other programmable logic devices, transistor logic devices, hardware components or any combination thereof. It may implement or execute various logical blocks, modules and circuits described in conjunction with the application of various embodiments. The processor 2801 may also be a combination that implements computing functions, for example, including, for example, and without limitation, a combination of one or more microprocessors, a combination of a DSP and a microprocessor, and the like.

The bus 2802 may include a path to transfer information between the above components. The bus 2802 may include, for example, and without limitation, a PCI (Peripheral Component Interconnect) bus, an EISA (Extended Industry Standard Architecture) bus and the like. The bus 2802 can be divided into an address bus, a data bus, and a control bus. For description, only one thick line is shown in FIG. 28, but it does not imply that there is only one bus or one type of bus.

The memory 2803 may include, for example, ROM (Read Only Memory) or other types of static storage devices that can store static information and instructions, and RAM (Random Access Memory) or other type of dynamic storage devices that can store information and instructions, and also can also be EEPROM (Electrically Erasable Programmable Read Only Memory), CD-ROM (Compact Disc Read Only Memory) or other optical disk storage, optical disk storage (including compressed Optical discs, laser discs, optical discs, digital versatile discs, Blu-ray discs, etc.), magnetic disk storage media or other magnetic storage devices, or can be any other medium that can carry or store desired program codes in the form of instructions or data structures and accessed by a computer, which is not limited to these.

The memory 2803 may be used to store application program codes for executing the solutions of various embodiments, and the processor 2801 controls the execution. The processor 2801 may be used to execute program codes stored in the memory 2803 to implement the content shown in the various embodiments described above.

The electronic devices according to various example embodiments may include but are not limited to: mobile terminals (for example, mobile phones, notebook computers, digital broadcast receivers, PDAs (personal digital assistants), PAD (tablet computers), PMP (portable multimedia players), vehicle terminals (e.g., vehicle navigation terminals)), fixed terminals (for example, digital TVs, desktop computers, etc.), or the like.

For example, the above BWP allocation method may be executed by a SON server or other servers, or may be executed by a base station. The electronic device shown in FIG. 28 may be a server or a base station. The electronic device shown in FIG. 28 is only a non-limiting example.

Various embodiments provide a computer-readable storage medium with a computer programs stored on the computer-readable storage medium, and the programs, when executed can execute the corresponding content in the various embodiments. Compared with the prior art, the BWP allocation method in the disclosure can meet the requirements of different services and different user capabilities, improve a network throughput, and reduce an energy consumption.

It should be understood that although the various operations in the flowchart of the drawings are displayed in sequence as indicated by the arrows, these operations are not necessarily performed in sequence in the order indicated by the arrows. Unless explicitly stated in this disclosure, the execution of these operations is not strictly limited in order, and can be executed in other orders. Moreover, at least a part of the operations in the flowchart of the drawings may include multiple sub-steps or multiple stages. These sub-steps or stages are not necessarily executed at the same time, but can be executed at different times, and the order of execution is also not necessarily performed sequentially, but may be performed alternately or alternately with other steps or sub-steps or stages of other steps or at least of a part of the sub-steps or stages of other steps It should be noted that the above computer-readable medium may be a computer-readable signal medium or a computer-readable storage medium, or any combination of the two. The computer-readable storage medium may be, for example, but not limited to, an electrical, magnetic, optical, electromagnetic, infrared, or semiconductor system, device, or device, or any combination of the above. More examples of the computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In the disclosure, a computer-readable storage medium may be any tangible medium that contains or stores programs, and the programs may be used by or in combination with an instruction execution system, apparatus, or device. However, in the disclosure, a computer-readable signal medium may include a data signal propagated in a baseband or as a part of a carrier wave, and a computer-readable program code is carried therein. This propagated data signal can have many forms, including but not limited to electromagnetic signals, optical signals, or any suitable combination of the above. The computer-readable signal medium may also be any computer-readable medium other than the computer-readable storage medium. The computer-readable signal medium may send, propagate, or transmit the programs for use by or in combination with the instruction execution system, apparatus, or device. The program codes contained on the computer-readable medium can be transmitted by any suitable medium, including but not limited to: wire, optical cable, RF (radio frequency), etc., or any suitable combination of the above.

The above computer-readable medium may be included in the above electronic device; or it may exist alone without being assembled into the electronic device.

The above computer-readable medium may carry one or more programs, and when the above one or more programs are executed by the electronic device, the electronic device is caused to execute the programs to realize various example embodiments described above.

The computer program codes used to perform the operations of the disclosure can be written in one or more programming languages or a combination thereof. The above programming languages include object-oriented programming languages—such as Java, Smalltalk, C++, and also conventional procedural programming language—such as "C" language or similar programming language. The program codes can be executed entirely on the user's computer, partly on the user's computer, executed as an independent software package, partly on the user's computer and partly executed on a remote computer, or completely executed on the remote computer or server. In the case of a remote computer, the remote computer can be connected to the user's computer via any kind of network, including a local area network (LAN) or a wide area network (WAN), or it can be connected to an external computer (for example, using an Internet service provider to access the Internet connection).

The flowcharts and block diagrams in the accompanying drawings illustrate the possible implementation architecture, functions, and operations of the system, method, and computer program product according to various embodiments of the disclosure. In this regard, each block in the flowchart or block diagram may represent a module, program segment, or part of code, and the module, program segment, or part of code contains one or more executable instructions for realizing the specified logic function. It should also be noted that, in some implementations, the functions marked in the block may also occur in a different order from the order marked in the drawings. For example, two blocks shown in succession can actually be executed substantially in parallel, or sometimes can be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations, or it can be realized by a combination of dedicated hardware and computer instructions.

The modules involved in the embodiments described may be implemented in software or hardware or any combination thereof. Wherein, the name of the module is not a limitation on the module itself under certain circumstances. For example, the acquiring module can also be described as "a module for acquiring base station data and data reported by the UE".

The above description is directed to various example embodiments and an explanation of the applied technical principles. Those skilled in the art should understand that the scope of application involved in this disclosure is not limited to the technical solutions formed by the specific combination of the above technical features, and should also cover other technical solutions formed by any combination the random combination of the above technical features or their equivalent features without departing from the above disclosed concept, for example, the technical solution formed by replacing the above features with the technical features with similar functions (but is not limited to) disclosed in the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A bandwidth part (BWP) allocation apparatus, comprising:
   an acquiring module comprising circuitry configured to acquire service-related information of at least one base station;
   a determining module comprising circuitry configured to determine configuration information of the BWP of the at least one base station based on the service-related information of the at least one base station; and
   an allocation module comprising circuitry configured to configure the BWP of the at least one base station based on the configuration information,
   wherein the service-related information comprises at least one of:
      a BWP class to be allocated;
      a traffic amount corresponding to the BWP class to be allocated;
      information of neighboring cell relation between base stations; and
      channel information of a user terminal (UE) served by a base station, and
   wherein the acquiring module is further configured to:
      acquire history traffic amount of at least one BWP class to be allocated of the at least one base station; and
      predict the traffic amount of the at one BWP class to be allocated of the at least one base station based on the history traffic amount of the at least one BWP class to be allocated of the at least one base station.

2. The apparatus according to claim 1, wherein the acquiring module is further configured to:
   classify UEs served by the at least one base station based on capability information and/or service type information of the UEs served by the at least one base station; and
   determine the BWP class of the at least one base station to be located based on the classification result of the UEs.

3. The apparatus according to claim 2, wherein the capability information of the UE includes at least one of a maximum bandwidth supported by the UE; and/or
   a service type of the UE comprises at least one of: massive Machine Type Communications (mMTC), ultra-Reliable and Low Latency Communications (uRLLC) or enhanced Mobile Broadband (eMBB).

4. The apparatus according to claim 1, wherein the traffic amount includes a physical resource block (PRB) usage.

5. The apparatus according claim 1, wherein the configuration information comprises a number of BWPs; the service-related information comprises the BWP class to be allocated;
   the determining module is further configured to
   determine a number of BWP classes to be allocated corresponding to at least one base station, as the number of BWPs of the at least one base station.

6. The apparatus according to claim 1, wherein the configuration information comprises a bandwidth of BWP; the service-related information comprises: the traffic amount corresponding to the BWP class to be allocated; and
   the determining module is further configured to:
      determine a bandwidth corresponding to at least one BWP of the at least one BWP class to be allocated of the at least one base station based on the traffic amount corresponding to the at least one BWP class to be allocated of the at least one base station.

7. A bandwidth part (BWP) allocation apparatus, comprising:
   an acquiring module comprising circuitry configured to acquire service-related information of at least one base station;
   a determining module comprising circuitry configured to determine configuration information of the BWP of the at least one base station based on the service-related information of the at least one base station; and
   an allocation module comprising circuitry configured to configure the BWP of the at least one base station based on the configuration information,
   wherein the service-related information comprises at least one of:
      a BWP class to be allocated;
      a traffic amount corresponding to the BWP class to be allocated;
      information of neighboring cell relation between base stations; and
      channel information of a user terminal (UE) served by a base station,
   wherein the configuration information comprises frequency location of the BWP; the service-related information comprises at least one of the BWP class to be allocated, information of the neighboring cell relation between base stations and the traffic amount corresponding to the BWP class to be allocated; and
   the determining module is further configured to:
      determine an allocation priority of the BWP to be allocated of the at least one base station, based on at least one of the BWP class to be allocated, the information of the neighboring cell relation between the base stations, and the traffic amount corresponding to the BWP class to be allocated; and
      sequentially configure frequency positions for the BWPs to be located based on the determined allocation priorities.

8. The apparatus according to claim 7, wherein, the determining module is further configured to:
   for each BWP to be allocated of the at least one base station, respectively acquire at least one of: a class priority corresponding to a class of a BWP to be allocated, a location priority corresponding to information of neighboring cell relation between base stations, and a priority of traffic amount corresponding to the BWP class to be allocated; and determine an allocation priority of the BWP to be allocated of the at least one base station based on the acquired at least one of priority information.

9. The apparatus according to claim 8, wherein:
a class priority corresponding to uRLLC is higher than a class priority corresponding to eMBB; and/or
a class priority corresponding to eMBB is higher than a class priority corresponding to mMTC; and/or
for the BWP class to be allocated for a same service type, a maximum bandwidth supported by the UE is positively correlated with the corresponding class priority.

10. The apparatus according to claim 8, wherein the determining module is further configured to:
for each BWP to be allocated of the at least one base station, acquire, based on the information of the neighboring cell relation between base stations, at least one of a number of neighboring cells of the base station corresponding to the BWP to be allocated, a number of UEs served by the base station, and a throughput of the base station;
determine a weight of the base station corresponding to the BWP to be allocated based on at least one of the number of neighboring cells, the number of UEs served by the base station, and the throughput of the base station; and
determine a location priority corresponding to the information of the neighboring cell relation between base stations, based on the weight of the base station corresponding to the BWP to be allocated.

11. The apparatus according to claim 10, wherein the at least one of the number of neighboring cells, the number of UEs served by the base station, and the throughput is positively correlated with the weight; and/or
the weight of the base station is positively correlated with the corresponding location priority.

12. The apparatus according to claim 8, wherein the traffic amount corresponding to the BWP class to be allocated is positively correlated with a corresponding traffic amount priority.

13. The apparatus according to claim 8, wherein:
for the BWP to be allocated with the same class priority, the location priority is positively correlated to the allocation priority; and/or
for the BWP to be allocated with the same location priority, the service priority is positively correlated to the allocation priority.

14. The apparatus according to claim 7, wherein the determining module is further configured to:
for the BWP to be allocated of at least one base station, based on the determined allocation priority, sequentially performing:
configure a frequency location for the BWP to be allocated based on a current available resource location set, and update the current available resource location set based on the information of the neighboring cell relation between base stations.

15. A bandwidth part (BWP) allocation apparatus, comprising:
an acquiring module comprising circuitry configured to acquire service-related information of at least one base station;
a determining module comprising circuitry configured to determine configuration information of the BWP of the at least one base station based on the service-related information of the at least one base station; and
an allocation module comprising circuitry configured to configure the BWP of the at least one base station based on the configuration information,
wherein the service-related information comprises at least one of:
a BWP class to be allocated;
a traffic amount corresponding to the BWP class to be allocated;
information of neighboring cell relation between base stations; and
channel information of a user terminal (UE) served by a base station, and
wherein the configuration information comprises a BWP power; the service-related information comprises at least one of the BWP class to be allocated, information of neighboring cell relation between base stations, and channel information of the UE served by the base station;
the determining module is further configured to:
based on there being a collision between frequency positions of at least two BWP classes, determine an overall collision value of the at least two BWP classes with a collision relationship;
determine the base station of which power is to be adjusted, based on the channel information of the UE served by the base station; and
adjust the power of the base station of which power is to be adjusted, based on the determined overall collision value.

16. The apparatus according to claim 15, wherein the determining module is further configured to:
for at least two BWP classes with a collision relationship, respectively determine collision values between one of the at least two BWP classes and the corresponding collision BWP classes, based on a predefined collision relationship table, wherein, the collision relationship table comprises collision values between at least one BWP class and the corresponding collision BWP class; and
determine the overall collision value based on the collision values corresponding to the at least two BWP classes and the information of neighboring cell relation between base stations.

17. The apparatus according to claim 15, wherein the determining module is further configured to:
determine location distribution information of the UE, based on the channel information of the UE;
determine a central area range of the UE, based on the determined location distribution information; and
set the base station positioned in the central area range as the base station of which power is to be adjusted.

18. The apparatus according to claim 15, wherein the determining module is further configured to:
determine a range of the overall collision value; and
adjust the power of the base station of which power is to be adjusted as a power corresponding to the range.

* * * * *